(12) United States Patent
Bodnar et al.

(10) Patent No.: US 7,433,710 B2
(45) Date of Patent: Oct. 7, 2008

(54) SYSTEM AND METHODOLOGY FOR AUTOMATED PROVISIONING OF NEW USER ACCOUNTS

(75) Inventors: Eric Bodnar, Santa Cruz, CA (US); William Swinton, Santa Cruz, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 884 days.

(21) Appl. No.: 09/839,972

(22) Filed: Apr. 20, 2001

(65) Prior Publication Data

US 2004/0218045 A1 Nov. 4, 2004

(51) Int. Cl.
*H04M 1/00* (2006.01)
*H04N 5/225* (2006.01)

(52) U.S. Cl. .............. 455/556.1; 455/557; 455/410; 455/411; 455/514; 348/207.1; 348/207.11; 348/211.2

(58) Field of Classification Search ........... 348/207.1, 348/207.11, 211.2; 455/406, 407, 408, 410, 455/411, 418, 419, 420, 556.1, 557, 514

See application file for complete search history.

(56) References Cited

U.S. PATENT DOCUMENTS

| | | | | |
|---|---|---|---|---|
| 5,430,827 A | * | 7/1995 | Rissanen | 704/272 |
| 5,734,831 A | | 3/1998 | Sanders | 709/223 |
| 5,737,491 A | * | 4/1998 | Allen et al. | 704/270 |
| 5,835,580 A | | 11/1998 | Fraser | 379/115.01 |
| 5,870,383 A | | 2/1999 | Eslambolchi et al. | 370/230 |
| 5,905,736 A | * | 5/1999 | Ronen et al. | 370/546 |
| 6,064,671 A | * | 5/2000 | Killian | 370/389 |
| 6,065,120 A | | 5/2000 | Laursen et al. | 713/201 |
| 6,067,568 A | | 5/2000 | Li et al. | 709/223 |
| 6,067,571 A | * | 5/2000 | Igarashi et al. | 709/232 |
| 6,163,604 A | | 12/2000 | Baulier et al. | 379/189 |

(Continued)

*Primary Examiner*—Duc Nguyen
*Assistant Examiner*—Huy Q Phan
(74) *Attorney, Agent, or Firm*—Blakely, Sokoloff, Taylor & Zafman, LLP; Judith A. Szepesi

(57) ABSTRACT

System and methodology are described that allow a new user of a user-operated device (e.g., wireless digital camera, cellular phone, video camera, audio device, or the like) to immediately begin using the features and services of the device without having to first activate a new user account. Thus in the instance where the user-operated device is a newly-acquired wireless digital camera, for example, the user can immediately begin taking and uploading his or her pictures to a photo Web site prior to having to open a user account, or having to perform other cumbersome activation steps. In such a wireless digital camera embodiment, the photo Web site and vendors of either cellular-enabled digital cameras or camera-enabled cellular phones provide user Web accounts based upon the unique ID or phone number belonging to one of these two devices. The user need only bother to "open" his or her account, that is, establish a user name and password, at some subsequent point in time that is convenient for the user (e.g., when the user is first visiting the photo Web site, using a browser, to view the digital photographs he or she previously uploaded). This approach allows users to use his or her newly-acquired device (e.g., immediately take pictures and upload them to an account at a photo Web site) right "out-of-the-box," all without having to first register or setup a new user account.

29 Claims, 12 Drawing Sheets

U.S. PATENT DOCUMENTS

| | | | |
|---|---|---|---|
| 6,167,469 A * | 12/2000 | Safai et al. | 710/62 |
| 6,226,752 B1 * | 5/2001 | Gupta et al. | 713/201 |
| 6,233,608 B1 | 5/2001 | Laursen et al. | 709/217 |
| 6,269,481 B1 * | 7/2001 | Perlman et al. | 717/178 |
| 6,292,657 B1 | 9/2001 | Laursen et al. | 455/411 |
| 6,633,907 B1 | 10/2003 | Spencer et al. | 709/223 |
| 6,636,259 B1 * | 10/2003 | Anderson et al. | 348/211.3 |
| 6,919,923 B1 * | 7/2005 | Tanaka et al. | 348/220.1 |
| 6,934,698 B2 * | 8/2005 | Judd et al. | 707/1 |
| 6,993,497 B2 * | 1/2006 | Yeh et al. | 705/14 |
| 7,015,806 B2 * | 3/2006 | Naidoo et al. | 340/531 |
| 2002/0082001 A1 * | 6/2002 | Tanaka et al. | 455/414 |
| 2002/0083004 A1 * | 6/2002 | Saneto et al. | 705/53 |
| 2002/0164977 A1 * | 11/2002 | Link, II et al. | 455/414 |
| 2003/0142215 A1 * | 7/2003 | Ward et al. | 348/207.1 |
| 2004/0109063 A1 * | 6/2004 | Kusaka et al. | 348/207.1 |
| 2004/0171371 A1 * | 9/2004 | Paul | 455/414.4 |

* cited by examiner

SYSTEM AND METHODOLOGY FOR AUTOMATED PROVISIONING OF NEW USER ACCOUNTS

RELATED APPLICATIONS

The present application is related to the following commonly-owned application(s): application Ser. No. 09/759,108, filed Jan. 11, 2001, entitled "Media Spooler System and Methodology Providing Efficient Transmission of Media Content from Wireless Devices"; and application Ser. No. 09/434,703, filed Nov. 5, 1999, entitled "Improved Digital Camera Device and Methodology for Distributed Processing and Wireless Transmission of Digital Images". The disclosures of each of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to the field of media processing and, more particularly, to system and methodology for efficient registration and provisioning of new user accounts, especially those which relate to creation and management of media content (e.g., digital images, sound, video, or the like) from wireless client devices (e.g., digital cameras with wireless capacity or connectivity to cellular phone devices).

2. Description of the Background Art

Today, digital imaging, particularly in the form of digital cameras, is a prevalent reality that affords a new way to capture photos using a solid-state image sensor instead of traditional film. A digital camera functions by recording incoming light on some sort of sensing mechanisms and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

In order to generate an image of quality that is roughly comparable to a conventional photograph, a substantial amount of information must be captured and processed. For example, a low-resolution 640×480 image has 307,200 pixels. If each pixel uses 24 bits (3 bytes) for true color, a single image takes up about a megabyte of storage space. As the resolution increases, so does the image's file size. At a resolution of 1024×768, each 24-bit picture takes up 2.5 megabytes. Because of the large size of this information, digital cameras usually do not store a picture in its raw digital format but, instead, apply compression technique to the image so that it can be stored in a standard-compressed image format, such as JPEG (Joint Photographic Experts Group). Compressing images allows the user to save more images on the camera's "digital film," such as flash memory (available in a variety of specific formats) or other facsimile of film. It also allows the user to download and display those images more quickly.

A variety of digital imaging devices are currently available to consumers. Regardless of how images are recorded digitally, at some later point in time, the image information must become available to other (display) devices—that is, become available to a larger network of digital devices, so that the images may be outputted (e.g., printed to hard copy) or shared with other people. Today, Web sites exist on the Internet with server computers having the capability to organize and display photographs. In a complementary manner, a multitude of different client devices exist with sufficient graphics capabilities for potentially viewing those photographs. For instance, such client devices range from desktop computers running Web browser software to handheld devices (e.g., running under Palm or Windows CE), all connected to the Internet over TCP/IP, each with the capability of displaying information.

Some digital cameras implement a wireless transmission capability for sending images they capture to photo-hosting Web sites on the Internet. In such an environment, the media-capturing device is typically attached (intermittently) to a cellular phone device, which in turn communicates through a wireless network to a gateway that enables further communication over the Internet.

Cellular-enabled digital camera devices, through the corresponding supporting server infrastructure that they wirelessly communicate with, provide "direct access" to photo Web sites at which users can view and share their digital photographs. On-line digital photographs are distributed to the photo Web site via many optional channels, one of which is the wireless client transmission of the image from wireless imaging devices, such as a cell-phone-coupled digital camera device. Ultimately, Web-accessible user accounts are the final destination/repository of digital images that were generated by these devices. These accounts are the users' access point to view and manipulate the transmitted images.

However, for existing implementations of photo-sharing Web sites, a new user must first create a Web account at a photo Web site prior to being able to use the coupled client devices to take pictures and upload them to the photo Web site. This activation of a new user account is cumbersome and sometimes obstructive for the new user, who, having obtained a cellular-enabled digital camera, would expect automated features in such a digital system, and would want to simply take snapshots and post them on a Web site with the camera, right "out-of-the-box." Of course, it is highly desirable to allow such client devices to be used directly out-of-the-box by new users without having to perform any prior-to-use manual account creation, such as account creation on a Web-resident server using a browser and/or other program. In addition to these reasonable needs and expectations of users, the manufacturers and vendors of such client devices, as well as photo Web site businesses, desire to implement services that provide reasonably simple mechanisms to allow for the development of efficient and effective customer support systems. To the point, today's system of not allowing a new user to use his or her newly-acquired device at the outset is inefficient. For instance, this prevents a new user from using his or her newly-acquired wireless digital camera to begin posting pictures (from the new camera) on the Web until after the user has first established a photo Web site user account.

Prior art attempts to address this account creation problem have been limited to manual techniques that are employed at the point of sale for such devices, whether they be cellular phone client devices or digital camera client devices. Albeit the new user accounts can be created at the point of sale, which transpires before the user can take pictures, such approaches still require the up-front human intervention (bookkeeping) for creating a new user account on the Web at the photo Web site and are, thus, suboptimal. Both the user and sometimes a sales support person fill out forms or otherwise notify the appropriate photo Web site that this user is associated with the serial number, or some unique valid ID, of either this cellular phone or this digital camera. Then the Web site provides the user with a unique user name and password for later accessing the new Web account being created at the point of sale. Other approaches have provided users, at the point of sale, account-enabling information to forward to a photo Web site either via a telephone number or via software running at the Web site. These systems do transact the account registration/activation "early," in that this bookkeeping precedes the user taking pictures with the new client(s) devices, but the user (and sometimes a sales support person) still partakes in the above-mentioned manual bookkeeping requirements prior to using the cellular-enabled camera for taking pictures and posting them on the Web.

Because of the ever-increasing popularity of these devices, much interest exists in finding a solution to these problems so that new users may begin enjoying the full capabilities and services of these devices at the outset, that is, directly "out-of-the-box".

SUMMARY OF THE INVENTION

Many user-operated devices require registration or account setup before useful operation. Wireless digital cameras, for example, are generally cellular-enabled, requiring the user to connect the camera to a cellular telephone that is capable of coupling with a digital camera in order to transmit, or upload, its photographs to a designated photo Web site. The present invention provides a system and methodology for automatically provisioning an account for new owners of such user-operated devices. In the instance of a wireless digital camera device, for example, this automatic provisioning of a new account at a photo Web site allows the user to take pictures and upload them, all without having to first register or setup a new user account.

The approach adopted is to automatically "pre-provision" a user account initially that corresponds to a system-internal identification value or datum that uniquely belongs to each client device (e.g., camera or cellular phone devices). The new user account is activated at the photo Web site when either the camera or phone leaves the factory or is applied at the point of sale, or either device automatically causes the creation of a destination account upon the client device's first interaction with a Web destination server.

This automatically-provisioned account allows the user of either a new cellular-enabled digital camera or camera-enabled cellular phone to take digital images (or other media content, such as video, audio, or the like) and upload them wirelessly to a photo Web site without having to first manually "open" an account. It is only when the user first connects to the photo Web site via a browser to look at his or her digital photographs that he or she establishes a user name and password via the site's UI (user interface). The user need never be required to "log in" or use his or her password to upload photographs from the wireless client; the user name and password are only necessary for accessing the account via a browser.

Two alternative device-based Web account-provisioning methods are described. The preferred embodiment is "camera-centric," that is, the camera device embodies a unique associative ID authorized to provision a user account at a photo Web site. The alternative is "phone-centric," that is, the cellular phone device embodies the unique associative ID authorized to provision a user account at a photo Web (server) site. With either method, the accounts are provisioned and managed by a single system at the server site. The wireless client device first contacts the photo Web site when the client initially transmits digital photographs to that site. Accompanying every client/server transaction, that is, each transmission of images from the client to the photo Web site, is the unique device ID, which a media gateway at the server authenticates for associating the incoming images with the appropriate account. The authentication involves checking with a back-end database for an existing account associated with the unique device ID, or, if none exists, creating a new account if the ID belongs to a pre-authorized device. When authenticated, the incoming digital images are transferred from a cache to a persistent image repository at the photo Web site. The database at the site is updated to enable the user to later access those images with his or her user name and password via a browser. In this manner, new users may begin enjoying the full capabilities and services of their newly-acquired devices at the outset.

GLOSSARY

Figure 1A:
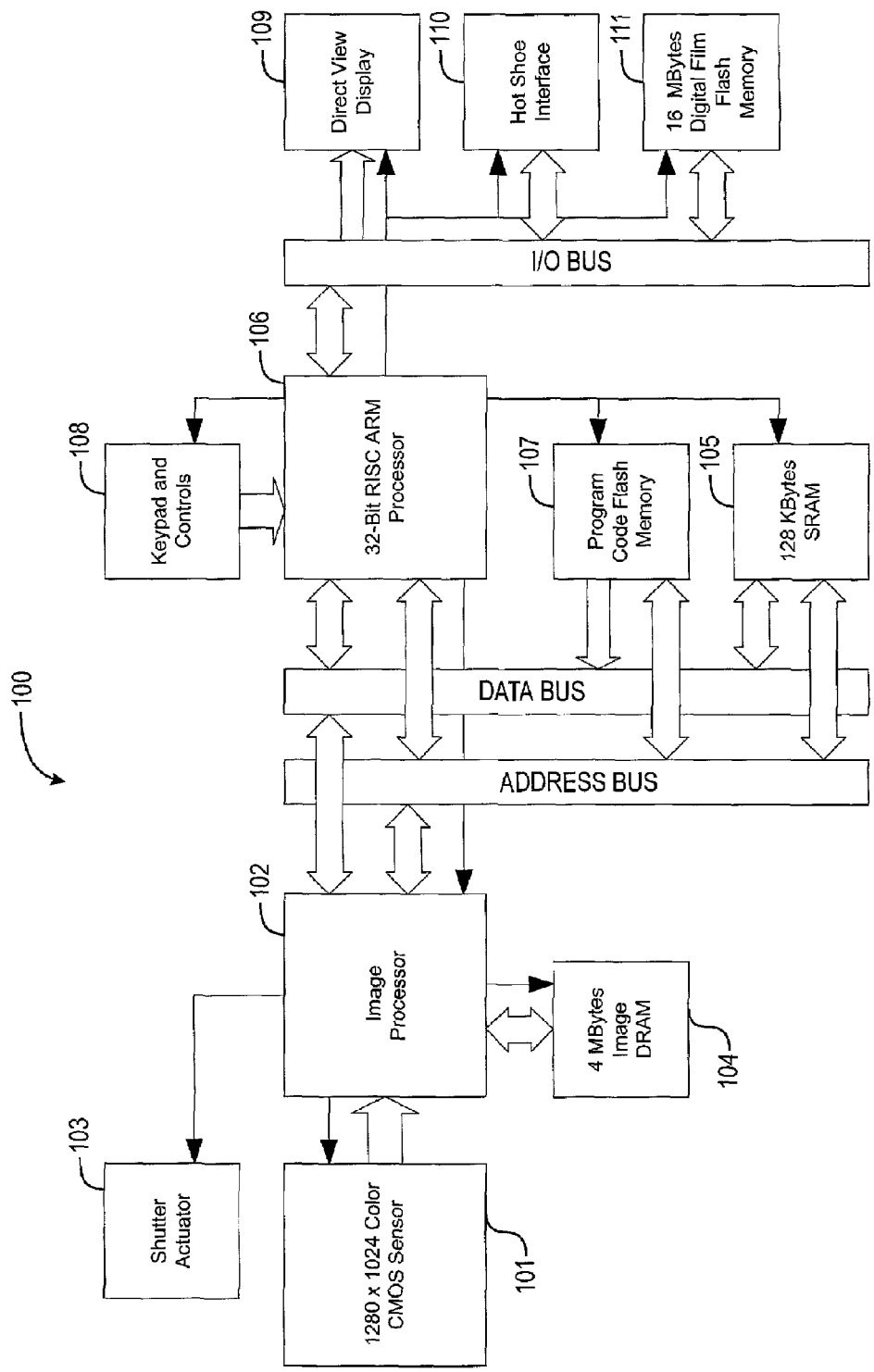
FIG. 1A is a block diagram illustrating a basic image capturing and recording system suitable for implementing a portion of the present invention.

Base32 Encoding: Base32 encoding is an encoding scheme, where binary information is encoded in a 32-character subset of the printable ASCII character set, allowing the binary information to be easily read or entered by a human user.

CDMA: CDMA is an acronym for Code-Division Multiple Access, a digital cellular technology that uses spread-spectrum techniques. Unlike competing systems, such as GSM, that use time-division multiplexing (TDMA), CDMA does not assign a specific frequency to each user. Instead, every channel uses the full available spectrum. Individual conversations are encoded with a pseudo-random digital sequence. Qualcomm became the first to commercialize it.

LAN: LAN is an acronym for Local Area Network. A LAN is a computer network that spans a relatively small area. Most LANs are confined to a single building or group of buildings. However, one LAN can be connected to other LANs over any distance via telephone lines and radio waves. Most LANs connect workstations and personal computers. Each node (individual computer) in a LAN has its own CPU with which it executes programs, but it is also able to access data and devices anywhere on the LAN.

HTTP: HTTP is the acronym for "Hyper Text Transfer Protocol," which is the underlying communication protocol used by the World Wide Web on the Internet. HTTP defines how messages are formatted and transmitted, and what actions Web site servers and browsers should take in response to various commands. For example, when a user enters a URL in his or her browser, this actually sends an HTTP command to the Web site server directing it to fetch and transmit the requested Web page. Further description of HTTP is available in RFC 2616: Hypertext Transfer Protocol—HTTP1.1, the disclosure of which is hereby incorporated by reference. RFC 2616 is available from the World Wide Web Consortium (W3C), and is currently available via the Internet at the following URL: http://www.w3.org/Protocols/.

IMEI: IMEI is an acronym for the International Mobile station Equipment Identity. IMEI is a number consisting of 15 digits, separated into 6 digits, 2 digits, 6 digits, and 1 digit. The IMEI is composed of the following elements (consisting of decimal digits only):
 (1) Type Approval Code (TAC). Its length is 6 digits.
 (2) Final Assembly Code (FAC) identifies the place of manufacture/final assembly.
 Its length is 2 digits;
 (3) Serial Number (SNR) is an individual serial number uniquely identifying each equipment within each TAC and FAC. Its length is 6 digits.
 (4) Spare digit: this digit is zero, when transmitted by the Mobile Station.

IMSI: For mobile wireless telephone to conform to the GSM (Groupe Spécial Mobile) standard, IMSI is the International Mobile Subscriber Identity used to identify the subscriber to the system; it is stored on the SIM (Subscriber Identity Module) smart card.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into most standard operating systems and is used by the Internet, making it the de facto standard for transmitting data over networks. Even network operating systems that have their own protocols, such as Netware, also support TCP/IP.

TDMA: TDMA is an acronym for Time Division Multiple Access, a technology for delivering wireless digital service using time-division multiplexing (TDMA). TDMA works by dividing a radio frequency into time slots and then allocating slots to multiple calls. In this way, a single frequency can support multiple, simultaneous data channels. TDMA is used by the GSM digital cellular system.

Wireless camera client: A wireless camera client is a digital camera that is capable of physically connecting with a cellular telephone for the purpose of leveraging the phone's wireless (data) communication capability to transmit digital images through the Internet, typically to be posted at a photo Web site for viewing and sharing via a browser. Although both devices can be used independently of each other, and often are because they also have discrete fully functional uses, this plug-and-play coupling is advantageous for digital photography. The camera can deploy the wireless communications capability of the cellular phone without intrinsically adding the weight, power requirements, and expense of a wireless system of its own.

XML: Extensible Markup Language (XML) is a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (URL is http://www.w3.org), the disclosure of which is hereby incorporated by reference. The specification is also currently available on the Internet at the URL, http://www.w3.org/TR/REC-xml.

DETAILED DESCRIPTION OF A PREFERRED EMBODIMENT

The following description focuses on an embodiment of the present invention employing a user-operated device (e.g., digital camera) for capturing media content (e.g., digital images, video, audio, or the like) that may be transmitted wirelessly, which is the currently-preferred embodiment. However, those skilled in the art will appreciate that the present invention may be embodied using other devices that require activation, including, for instance, cellular phone devices. Further, the description will focus on implementation of portions of the invention in an Internet-connected environment including desktop and server computers, such as an IBM-compatible computer running under Microsoft® Windows 2000. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation.

Basic System

A. Digital Camera Hardware

FIG. 1A is a block diagram illustrating a basic image capturing and recording system 100 suitable for implementing a portion of the present invention pertaining to initial capture of digital media, which then may be transmitted to a host system (e.g., computer system) using wireless technique. The system 100 also supports transmission using wireline technique. For purposes of illustration, the following will focus on implementation of the system 100 as a digital camera. However, as noted above, for purposes of implementing the methodology of the present invention, the system 100 may also be implemented in a variety of other devices that require activation of a user account.

As shown in FIG. 1A, the system 100 includes a Sensor 101, a Shutter Actuator 103, an Image Processor 102, an Image (DRAM) Memory 104, a (Central) Processor 106, a Keypad and Controls 108, a Program Code Flash Memory 107, a (System) Memory 105, a Direct View Display or Viewfinder 109, a Hot Shoe Interface 110, and a "Digital Film" Flash Memory 111. As illustrated, these various components communicate with one another using a bus architecture including, for instance, an Address Bus, a Data Bus, and an I/O (Input/Output) Bus.

The system 100 employs the Sensor 101 for basic image capture. The Sensor 101 operates, in essence, by capturing light and transforming that into electrical voltage levels. A suitable sensor is available from a variety of vendors, including VLSI Vision, Motorola, and Toshiba. In a preferred embodiment, the Sensor 101 includes, for example, a 1280× 1024 color CMOS sensor, such as a VLSI Vision VVL 6801 CMOS sensor. However, other sensor technology is suitable, including CCD sensors.

The Sensor 101 must, of course, be part of a larger assembly to operate. Specifically, the Sensor 101 operates in conjunction with a lens assembly (not shown), or other optics to focus an image onto the sensor. The optics themselves are controllable, for instance, using a conventional aperture, focus, and shutter control mechanisms. The currently-preferred embodiment uses an 18 mm fixed-focal length, fixed-aperture lens assembly to provide a broad depth of field. The lens assembly employs two manual slide controls, a macro lens control, and an exposure control. The macro lens control switches from normal to close-up mode by sliding a macro lens in and out of the lens assembly to provide normal or extreme close-up capability. The exposure control switches from normal to bright light by sliding a neutral gray filter in and out of the lens assembly. Aside from choosing normal or bright light, normal or close-up mode, the camera requires no manual focusing, shutter speed, or aperture adjustment. Operation is as simple as point and shoot. The Sensor 101, on the other hand, operates under the control of the Image Processor 102, which will now be described.

The Image Processor 102, which basically operates as a state machine, provides overall control for the Sensor 101. In operation, the Image Processor 102 controls the Sensor 101 by, in effect, telling it what to do and when. For instance, the Image Processor 102 issues timing signals to the Sensor 101 for indicating how the Sensor 101 should record and stream out image data. Further, the Image Processor 102 provides general Input/Output (I/O) control that allows one to coordinate control of the sensor with other electromechanical peripherals, such as a shutter, lens aperture, or the like.

Actual implementation of the Image Processor 102 itself may be accomplished in a variety of different ways. For a microprocessor-based implementation, for instance, the Image Processor 102 may be implemented as a microprocessor (e.g., PowerPC 823 microprocessor, available from Motorola, Inc. of Schaumburg, Ill.) with DSP (digital signal processing) logic blocks, memory control logic blocks, video control logic blocks, and interface logic. Alternatively, the Image Processor 102 may be implemented as a "camera on a chip(set)" using, for instance, a Sierra Imaging Raptor I or II chipset (available from Sierra Imaging, Inc. of Scotts Valley, Calif.), a Sound Vision Clarity 1 or 2 chipset (available from Sound Vision, Inc. of Framingham, Mass.), or similar chipset that integrates a processing core with image processing periphery. In a preferred embodiment, the Image Processor 102 preferably supports hardware implementation of a wavelet-transform engine complete with a wavelet-transform filter bank, so that the wavelet-transform process may be pipelined through a series of dedicated hardware gates (instead of executed as a sequence of software instructions repeatedly loaded and processed by a general-purpose microprocessor).

The Image Processor 102 is not a stand-alone part but, instead, relies on the (Central) Processor 106 for control instructions. The Image Processor 102 sits on the Address and Data Buses and is accessible by the Processor 106 through a series of registers. In this manner, the Processor 106 may instruct the Image Processor 102 what to perform and when. For instance, the Processor 106 may instruct the Image Processor 102 to turn on the Sensor 101, to capture an image at the Sensor 101, and to execute the wavelet transform. Therefore, the Image Processor 102 is very much a facilitator but is not in and of itself a controller for the system.

The Shutter Actuator 103 is a simple, generic component for controlling light exposure on the Sensor 101. Depending on the behavior of the actual sensor employed, the Shutter Actuator 103 may not even be necessary. In particular, the Shutter Actuator 103 is employed in those instances where the Sensor 101 requires a black reference. In such an embodiment, the Shutter Actuator 103 is an electromechanical interface coupled to a solenoid which, when the interface responds to a particular logic level, triggers an open/close cycle of a mechanical shutter. The mechanical shutter, which serves to selectively block light entering the lens assembly of the camera, may be of a conventional design available from a variety of suppliers. A suitable supplier includes, for instance, Sunex, Inc. of Carlsbad, Calif.

The Image Memory (DRAM) 104 serves to store the image captured from the Sensor 101. The Sensor 101 itself does not "store" the image that it captures. Therefore, the Image Memory 104 is an image-capture and in-place transform (frame) buffer. This memory is controlled by the Image Processor 102 and can be shut off when not in use for power-saving purposes. During basic operation of the camera, the captured image is transferred directly into the Image Memory 104, using a sample/transfer technique. In order to make this efficient, the process is controlled by the Image Processor 102 in a manner somewhat akin to DMA (direct memory access) transfer employed on desktop computers. Here, the Image Processor 102 functions as a state machine which simply samples and transfers information from the Sensor 101 to the Image Memory 104. In the presently-preferred embodiment, the Image Memory 104 comprises conventional DRAM (dynamic random-access memory) memory available from a variety of vendors, including, for instance, Toshiba, Micron, Hitachi, Samsung, and others. A size of about 4 MB (megabyte) or more is suitable for this component.

The next several components discussed, which may be viewed as components hanging off of the Address and Data Buses of the Processor 106, are typical components that one would ordinarily expect to find when implementing a data processing device; collectively, these components may be viewed as a computer embedded in the camera. For example, these components include the previously-mentioned general-purpose microprocessor (Processor 106) coupled to memory (System Memory 105 and Program Code Flash Memory 107). The Working or System Memory 105 is the general working or scratchpad memory for the Processor 106. This memory is used for storing program-created variables, stacks, heap(s), and the like. In the presently-preferred embodiment, the System Memory 105 comprises static RAM (e.g., SRAM), which is also available from a variety of vendors. A size of about 128 KB (kilobyte) or more is suitable for this purpose. The Program Code Flash Memory 107, on the other hand, comprises 1 MB of directly-addressable flash storage that holds the operating system and embedded software, that is, the program code comprising the instructions that the processor must execute to operate. The flash memory, which may be conventional flash memory that is available from a variety of vendors, need not be of the removable type, as the Program Code Flash Memory 107 is not intended to be removed from the system by the camera user.

The Processor 106 itself, in the presently-preferred embodiment, comprises a 32-bit RISC ARM Processor designed by ARM Limited of Maidenhead, UK. ARM licenses its designs to semiconductor partners for manufacture, supply, and support; for a list of ARM licensees, see e.g., http.//www.arm.com/Partners/. The ARM processor has an efficient instruction set that is ideal for performing cyclical functions quite rapidly and includes sufficient bandwidth for transferring large amounts of data quickly (e.g., for performing Huffman coding on a large amount of data). Additionally, the processor is a dedicated processor, without the overhead of a substantial number of peripherals. These features make the processor attractive for use in a digital camera embodiment.

For a camera embodiment, the device will, in general, be expected to include an interface that is capable of receiving input from users. Keypad and Controls 108 are conventional inputs that support user input. Similarly, the Direct View Display ("Viewfinder") 109 is a direct view LCD (liquid crystal display) that provides feedback to the user or camera operator. During photography mode, the Viewfinder 109 replaces the plastic viewfinders and LCD panels found on most digital cameras and provides the most accurate real-time representation of the scene visualized by the sensor. The Viewfinder 109 overlays simple icons onto the image to indicate the status of various camera settings. The Viewfinder 109 fits inside an eyepiece which keeps sunlight out and allows the operator to visualize the scene in any lighting conditions. During preview mode, the Viewfinder 109 shows previews of the captured photos and allows the operator to delete unwanted photos or tag photos for wireless transmission. Thus for a camera embodiment, the Viewfinder 109 is used to provide a representation of the image that is being captured, in preview and/or post-capture fashion.

In order to provide the display image to the Viewfinder 109, the Sensor 101 is subsampled at a rate to create a version of the image appropriate for display. During preview processing, the system continuously captures the sensor mosaic and sub-samples the resulting mosaic for preview purposes. A histogram of the sampled luminosity is fed into a "linearization" filter to produce a balanced dynamic range for best optical perception. The scaled and "linearized" image is then displayed on the viewfinder module. The histogram data is then adjusted to match the preview image for use in linearizing the next image. The cycle is repeated continuously to provide a real-time viewfinder mechanism. The Viewfinder 109 itself typically operates in conjunction with a display controller and a frame buffer (not shown), both of which may be integrated within the display component itself.

Both the Keypad and Controls and Direct View Display components, which may be conventional in nature, interface directly with the Processor 106 through general I/O (e.g., I/O Bus). Typically, such devices communicate with the microprocessor through means of interrupt requests (IRQ). Both the Keypad and Controls and Direct View Display components are available from a variety of vendors. Examples include Sharp, Toshiba, and Citizen of Japan, Samsung of South Korea, and Hewlett-Packard of Palo Alto, Calif. More customized displays are available from Displaytech, Inc. of Longmont, Colo. For an embodiment that does not need to interact with users, such as a surveillance camera, the foregoing components may be eliminated.

Additionally for a camera embodiment, it is desirable for the device to include an interface for standard peripheral devices, such as a detachable flash device. This may be provided by Hot Shoe (Accessory) Interface 110, which is a general I/O port that may comprise a serial interface of a conventional design that the camera uses to interface to its accessories via the Hot Shoe Interface. In this manner, a flash accessory can be clipped onto the camera via the Hot Shoe Interface for added illumination.

The Hot Shoe Interface 110 combines a Serial Peripheral Interface (SPI) with a multiplexed I/O bus which provides a plug-and-play interface to a family of accessories. These accessories may include, in addition to a flash unit, a wireless holster for cellular phones (e.g., available from Motorola, Nokia, Ericsson, and Samsung), extra film backs for compatibility with format digital film (e.g., Sony Memory Stick or SmartMedia), a USB cradle, an RJ-11 modem cradle, a wireless cellular module, extender cables, and the like. In the currently-preferred embodiment, the interface is based on the $I^2C$-standard serial interface, which supports logic allowing the device to sense $I^2C$-compatible devices that are attached to the port. $I^2C$, which stands for Inter IC Communication, is a serial bi-directional communication protocol created by Philips Semiconductor (subsidiary of Philips Electronics, based in The Netherlands) and is used for communication between integrated circuits. Most systems have one master and several slaves that communicate using only two wires. Every device has its own identification code. If that code is sent by the master only that device will respond with an acknowledgement. After the acknowledgement, the data to be communicated is sent or received by the master. Further information about the $I^2C$ communication protocol is available from Philips Electronics of The Netherlands. As with the Keypad and Controls 108 and Direct View Display or Viewfinder 109, the Hot Shoe Interface 110 itself is not required for implementing the image capturing and processing methodology of the present invention. In the specific embodiment of a consumer product such as a camera, though, these components typically would be included.

The system includes Digital Film Flash Memory 111, which serves as the "digital film" for the system for storing compressed images. The Flash Memory 111 may comprise available flash memory removable media, such as Compact-Flash, DataFlash, and Sony Memory Stick, typically in a 16 MB or larger size. Available vendors for flash memory include, for example, SanDisk of Sunnyvale, Calif. or Sony of Japan. Alternatively, the Flash Memory 111 may be affixed directly (i.e., non-removable) to the system 100. In such an embodiment, the additional bulk associated with a removable media cartridge holder and its accompanying interface may be avoided. Those skilled in the art will appreciate that the system 100 may incorporate other non-volatile memory configurations and designs that readily accommodate the image capture and processing methodology of the present invention. In general, for a consumer device embodiment, one should choose media that accommodates on the order of 100 compressed images or more.

The camera embodiment is powered by a single CR-123 lithium battery (not shown), provided with instant-on capability. Due in part to the distributed image processing approach of the present invention (presented below), the camera has significant power savings over other camera designs.

This gives the device not only a size and weight advantage over other cameras but also a battery life advantage.

For connectivity, the system includes a wireless holster, a USB cradle, and a modem cradle. The wireless holster physically connects the camera to a cellular phone (e.g., Motorola StarTAC cellular phone) and interfaces the Hot Shoe Interface to the phone's external accessory plug. The camera can be easily pulled out of the holster for use and clipped back in for transmission. Detection of the holster and phone signal is automatic to allow for hands-free transmission and there is no risk of corruption due to interruption by either loss of signal or unclipping. The camera clips into the USB cradle through the Accessory Hot Shoe Interface 110 to provide rapid photo interchange to a personal computer equipped with a standard USB port. The USB cradle acts a USB slave device and therefore requires no batteries or power supply for operation and instead draws its power from the PC. The camera can also clip into a modem cradle through the Hot Shoe Interface. The modem cradle allows the camera to transmit images to the PhotoServer via a land line connection (e.g., 33.6 KBps) via a standard RJ-11 phone jack. The modem cradle is powered by the battery in the camera.

The specifications for the currently-preferred camera embodiment may be summarized as follows.

TABLE 1

Miniature Wireless Digital Camera Specifications:

| | |
|---|---|
| Sensor: | 1.3 Mega-Pixel Color CMOS |
| Optics: | 18 mm Fixed Focal Length, Fixed Aperture |
| Exposure Control: | Automatic, Macro Mode, Indoor/Outdoor Mode |
| Processor: | ARM 32-bit RISC |
| Chipset: | Image Processor (Lightsurf PhotonOne) |
| Memory: | 4 Mbytes DRAM + 128 Kbytes SRAM |
| Digital Film: | 16 Mbytes Internal Flash Film |
| File Format: | Progressive Photograph Format (PPF) |
| Wireless Protocol: | Communication protocol, such as packet-based TCP/IP, WAP, or the like |
| Battery: | CR-123 |
| Accessory Interface: | Accessory Hot Shoe |
| Accessories: | Flash Unit, Extra Film Back, Motorola Cellular Holster, USB Cradle, Modem Cradle |

Further description of the system 100 may be found in the above-mentioned commonly-owned application Ser. No. 09/434,703 (Docket No. LS/0001.01).

The above-described system 100 is presented for purposes of illustrating the basic hardware underlying a client device (e.g., wireless digital camera) that may be employed in the system of the present invention. The present invention, however, is not limited to just digital camera devices but, instead, may be advantageously applied to a variety of user-operated devices capable of participating and/or benefitting from the methodologies of the present invention presented in detail below.

B. Basic Computer Hardware (e.g., For Desktop and Server Computers)

Figure 1B:
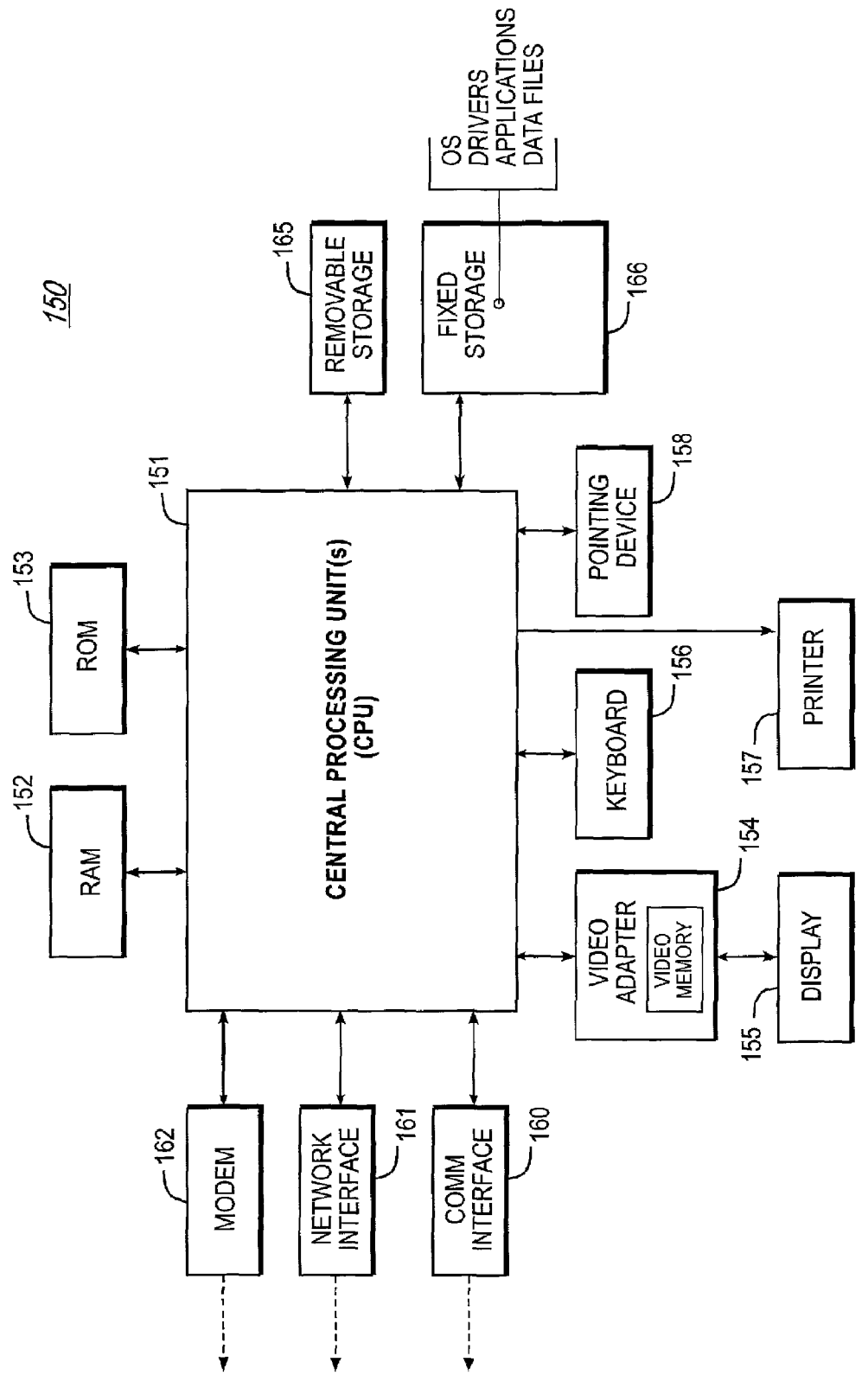
FIG. 1B is a block diagram of a general-purpose computer system suitable for implementing distributed image processing portions of the present invention.

Apart from the above example of a client device (i.e., wireless digital camera), portions of the present invention may be implemented on a conventional or general-purpose computer system, such as an IBM-compatible personal computer (PC) or server computer. FIG. 1B is a very general block diagram of an IBM-compatible system 150, which is adapted to include portions of the distributed image processing of the present invention. As shown, system 150 comprises a central processor unit(s) (CPU) 151 coupled to a random-access memory (RAM) 152, a read-only memory (ROM) 153, a keyboard 156, a pointing device 158, a display or video adapter 154 connected to a display device 155, a removable (mass) storage device 165 (e.g., floppy disk), a fixed (mass) storage device 166 (e.g., hard disk), a communication port(s) or interface(s) 160, a modem 162, and a network interface card (NIC) or controller 161 (e.g., Ethernet). Although not shown separately, a real-time system clock is included with the system 150, in a conventional manner.

CPU 151 comprises a processor of the Intel Pentium® family of microprocessors. However, any other suitable microprocessor or microcomputer may be utilized for implementing the present invention. The CPU 151 communicates with other components of the system via a bi-directional system bus (including any necessary I10 controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 152 serves as the working memory for the CPU 151. In a typical configuration, RAM of sixteen megabytes or more is employed. More or less memory may be used without departing from the scope of the present invention. The read-only memory (ROM) 153 contains the basic input/output (I/O) system code (BIOS)—a set of low-level routines in the ROM that application programs and the operating systems can use to interact with the hardware, including reading characters from the keyboard, outputting characters to printers, and so forth.

Mass storage devices 165, 166 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 1B, fixed storage 166 stores a body of program and data for directing operation of the computer system, including an operating system, user application programs, driver and other support files, as well as other data files of all sorts. Typically, the fixed storage 166 serves as the main hard disk for the system and stores system and application software.

In basic operation, program logic (including that which implements methodology of the present invention described below) is loaded from the storage device or mass (fixed) storage 166 into the main (RAM) memory 152, for execution by the CPU 151. During operation of the program logic, the system 150 accepts user input from a keyboard 156 and a pointing device 158, as well as speech-based input from a voice recognition system (not shown). The keyboard 156 permits selection of application programs, entry of keyboard-based input or data, and selection and manipulation of individual data objects displayed on the display device 155. Likewise, the pointing device 158, such as a mouse, track ball, pen device, or the like, permits selection and manipulation of objects on the display device 155. In this manner, these input devices support manual user input for any process running on the system.

The computer system displays text and/or graphic images and other data on the display device 155. Display device 155 is driven by the video adapter 154, which is interposed between the display device 155 and the system 150. The video adapter 154, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 150, may be obtained from the printer 157, or other output device. The printer 157 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 161 connected to a network (e.g., Ethernet network), and/or a modem 162 (e.g., 56K baud, ISDN, DSL, or cable modem), examples of which are available from 3Com of Santa Clara, Calif. The system 150 may also communicate with local occasionally-connected devices (e.g., serial cable-linked devices) via the communication ("comm") interface 160, which may include an RS-232 serial port, a Universal Serial Bus (USB) interface, or the like. Devices that will be commonly-connected locally to the comm interface 160 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

As in the case of the example client device (i.e., system 100), the above-described system 150 is presented for purposes of illustrating the basic hardware underlying desktop and server computer components that may be employed in the system of the present invention. For purposes of discussion, the following description will present examples in which it will be assumed that there exists a "server" (e.g., Web server) which communicates with one or more "clients" (e.g., media-capturing devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

C. Basic System Software

Figure 2:
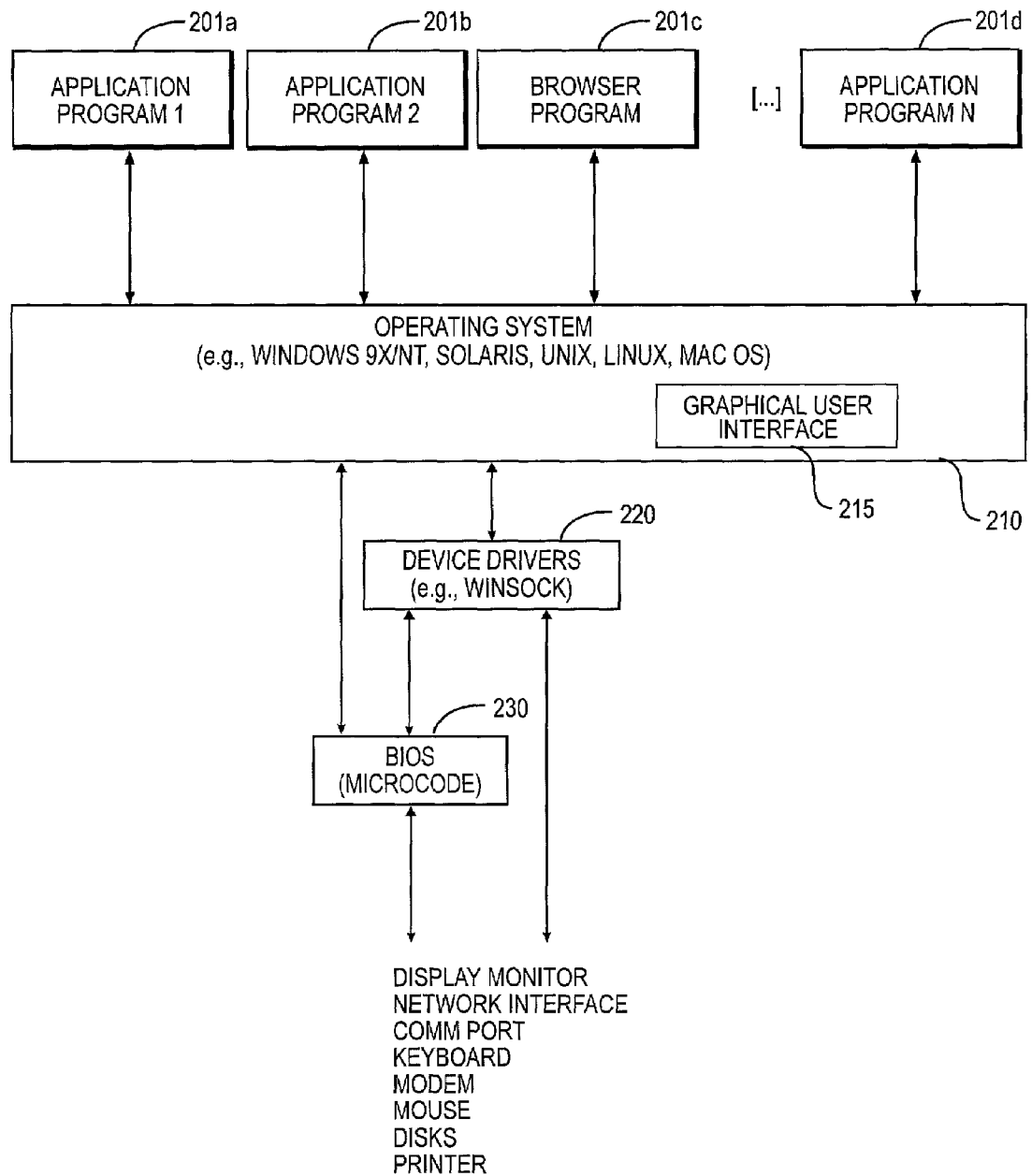
FIG. 2 is a block diagram of a software system suitable for directing the operation of the computer of FIG. 1B.

Illustrated in FIG. 2, a computer software system 200 is provided for directing the operation of the computer system 150. Software system 200, which is stored in system memory (RAM) 152 and on fixed storage (e.g., hard disk) 166, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d), including image processing software, may be "loaded" (i.e., transferred from fixed storage 166 into random-access memory 152) for execution by the system 150.

Software system 200 includes a graphical user interface (GUI) 215, for receiving user commands and data in a graphical (e.g., "point-and-click") fashion. These inputs, in turn, may be acted upon by the system 100 in accordance with instructions from operating system 210 and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) which communicates with one or more "clients," such as wireless digital camera devices or other client (i.e., user-operated) devices. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Automated Provisioning of New User Accounts

A. Overview

The present invention provides a method that automatically provisions new user accounts. The method is especially applicable to services that typically have required manual "user activation" upon commencement of services. In the currently-preferred embodiment, which is embodied in a wireless digital camera environment, the method operates by automatically provisioning a new user account "stub" at a commercial photo Web site with account identification information or a datum corresponding to either a unique digital camera or cellular phone built-in device identification. This provisioning is automatic in that it requires no explicit action on the part of the user. Additionally, the method of the present invention "pre-provisions" an account by automatically creating, initializing, and activating an unnamed user account at the photo Web site that is pre-registered to receive images that are transmitted wirelessly from particular target client device, such as either a digital camera or cellular phone. In this manner, the user can enjoy taking pictures and posting them to a photo Web site immediately upon taking the digital camera out of the box—all without having to perform some sort of user activation or other explicit account creation bookkeeping task first.

In the currently-preferred embodiment and a first alternative embodiment, the present invention provides that either a wireless-capable digital camera device or a camera-capable cellular phone has an automatically pre-provisioned user account at a photo Web site. This pre-provisioned user account may be instantiated either when it leaves the factory or at the point-of-sale, or even instantiated upon the client device's first interaction with a Web destination server (which causes the automatic creation of a destination account). Two alternative device-based Web account provisioning schemes, which correspond to the above-mentioned embodiments, are provided. The currently-preferred embodiment is "camera-centric," that is, the camera device embodies unique associative identification data or information that allows for the provisioning of a user account at a photo Web site. The alternative is "phone-centric." Here, the cellular phone device embodies the unique associative identification data or information that allows for the provisioning of a user account at a photo Web site. In both embodiments, the method of the present invention provides an automatic out-of-the-box initial provisioning of an account upon the first wireless contact to a supporting Web server, such that the initial provisioning requires no manual action on the part of the user.

B. Pre-Provisioning System Architecture: Photo Web Account Embodiment

Figure 3:
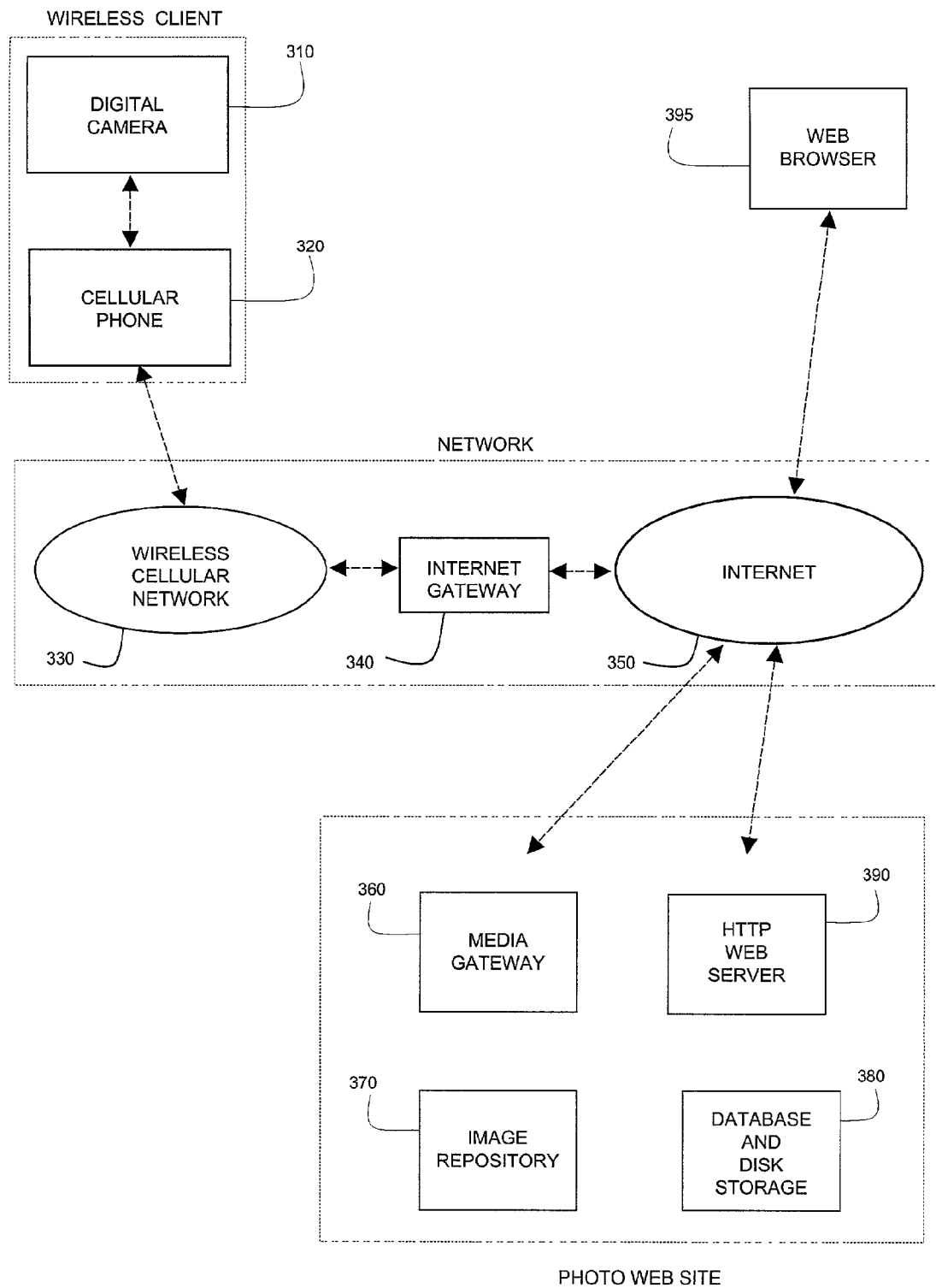
FIG. 3 is a high-level block diagram illustrating the configuration of the multiple components in the underlying system's architecture employed in a preferred embodiment.

FIG. 3 is a high-level block diagram illustrating the configuration of the multiple components in the underlying system's architecture employed in a preferred embodiment. As shown in FIG. 3, the working environment of the system includes a digital camera device 310, a cellular phone 320, a wireless cellular phone network 330, an Internet gateway 340 provided by the cellular phone carriers, the Internet 350, a media gateway or spooler 360 for the photo Web site service, an image repository 370 at the photo Web site service, a back-end database 380, an HTTP web server 390, and users' Web browsers 395. Each will be described in further detail.

The digital camera 310, which may be the above-described system 100, captures a digital image whenever the user takes a snapshot. The digital camera 310 has a direct short-wire connection or mating (i.e., non-wire coupler) connection to the cellular phone 320 that allows the digital camera 310 to access the data services of the wireless cellular network 330. When the camera user wants to post the captured image(s) to a photo Web site, he or she uses the keyboard portion of the cellular phone 320 to cause the camera to access the wireless cellular phone network 330, which is data-call capable (i.e., the cellular network can bear data), through the cellular phone 320. The data transmission uses the TCP/IP protocol. The wireless cellular phone network 330 is typically a CDMA, TDMA, or a third generation cellular network.

Incoming data-call traffic from the wireless cellular phone network 330 achieves Internet connectivity via the Internet gateway 340 which relays the transmission to the Internet 350. The Internet gateway 340 is a computer server(s) provided by (or in conjunction with) the cellular phone carriers. The Internet gateway 340 either connects directly to the Internet 350 or forwards the data to an Internet service provider (ISP) who then forwards the data on to the Internet 350. The destination of the data traffic from wireless cameras is the media gateway or spooler 360, which is a computer server provided by the photo Web service to efficiently upload photos from a multitude of client devices. The media gateway 360 is, in turn, connected to an image repository 370 by a high-speed LAN. Further description of the media gateway or spooler 360 may be found in the above-mentioned commonly-owned application Ser. No. 09/759,108 (Docket No. LS/0009.00). The media gateway 360 is adapted in the currently-preferred embodiment to include (or operate in conjunction with) an identifier (ID) module (described below).

The image repository 370 creates, activates, and accesses user accounts and associates images with each account. The image repository 370 connects directly, or by high-speed LAN, to the back-end database 380, which is a relational database (e.g., Oracle 8i available from Oracle Corporation of Redwood Shores, Calif.) that maintains the images and user account information at the photo Web site. The HTTP web server 390 is the computer server of the photo Web site that serves up images on demand to the user's browsers 395. The user requests from their browsers 395 communicate with the image repository 370 via the Internet 350 using the HTTP protocol. The communications of the browsers 395 with the image repository server 370 typically do not go through the media gateway 360 in the currently-preferred embodiment.

Figure 4:
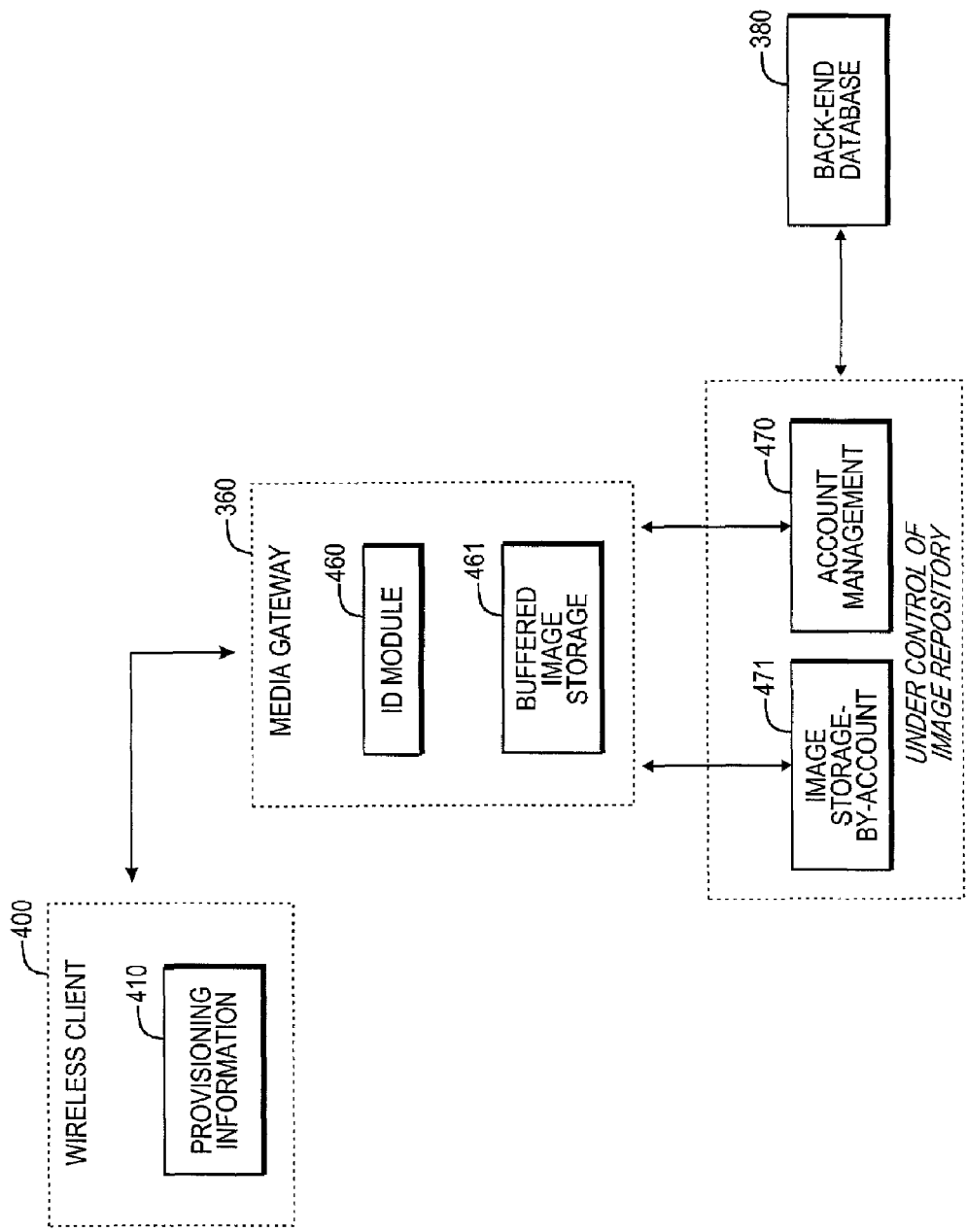
FIG. 4 is a block diagram illustrating the account provisioning functionality of the present invention with regard to where its five software modules reside that are embedded within three of the system's components.

The account provisioning functionality of the present invention is embodied in five software modules embedded within three of the components in the system. FIG. 4 is a block diagram illustrating where these software modules reside. As shown in FIG. 4, the software system includes a wireless camera client 400, a provisioning information module 410, an ID module 460, a buffered image storage module 461, an account management module 470, and an image storage-by-account module 471. FIG. 4 also includes some of the hardware components as previously described in FIG. 3. As shown in FIG. 4, the wireless camera client 400 is the component comprised of the coupling or mating of both the digital camera device 310 and the cellular phone 320 that together process the wireless camera client functionality, which in turn communicates with the other components.

As shown in FIG. 4, the provisioning information module 410 is within the wireless camera client 400, either running in the digital camera device 310 (camera-centric) or in the cellular phone device 320 (phone-centric). The provisioning information module 410 has direct access to, or calculates, a valid unique client device ID (datum) that the present invention may employ (e.g., directly or indirectly) to create an account identifier (e.g., primary key) for provisioning a new account. In an embodiment employing the system 100 as a wireless digital camera device, for instance, each such device includes a device-specific serial number in the form of a globally-unique device identifier or gDevID. The provisioning information module 410 may communicate with the camera user via the keyboard and LCD (liquid crystal display) on the cellular phone device 320 to also allow the user to determine the device ID, such as the serial number for the digital camera (camera-centric) or the activated phone number for that cellular phone (phone-centric). The provisioning information module 410 transmits the necessary provisioning information to the media gateway 360 across the network as previously described. In the preferred embodiment, which is camera-centric, the ID module 460 in the media gateway 360 is responsible for determining if the unique device ID within the provisioning information is coming from a valid type of digital camera device 310.

As shown in FIG. 4, the buffered image storage module 461 receives and temporarily holds images that are transmitted across the network to the media gateway 360 as previously described. However, prior to buffered image storage module 461 receiving any images, the ID module 460 in the media gateway 360 garners provisioning data from the wireless camera client's transmission that is used to validate and accept incoming digital images, and then directs those validated incoming digital images along with their associated account ID data to the image repository 370. The buffered image storage module 461 embodies computer-implemented methods that communicate with the provisioning information module 410 (and the camera user) to interactively complete the request for key provisioning information, and also includes methods for communicating with the two modules in the image repository 370: the account management module 470 and the image storage-by-account module 471. The method for communicating with the account management module 470 relays the provisioning information to the account management module 470 which performs key steps in the provisioning procedure to help the image storage-by-account module 471 determine where to store the digital images in the back-end database 380.

The account management module 470 in the image repository 370 receives the provisioning information from the ID module 460, and determines if the image repository 370 has ever communicated with this particular wireless camera client 400 before. If it has, it can appropriate the images in the buffered image storage module 461 to the corresponding existing user account. If this is the first time this particular wireless camera client 400 has contacted the image repository 370, then the account management module 470 creates a new account to be associated with the digital images in the buffered image storage module 461. The image storage-by-account module 471 stores the provisioning ID data, and account information, in the back-end database 380. Once a user account is known by the ID module 460, the digital images are received by the image storage-by-account module 471 from the buffered image storage module 461. After the images are transferred to the image storage-by-account module 471, the buffered image storage module 461 frees space in its buffer that was occupied by those images.

C. Account Provisioning Methodology

The overall method steps of an account provisioning methodology constructed in accordance with the present invention may be summarized as follows.

1. Camera-Centric Account Provisioning Methodology

Figure 5:
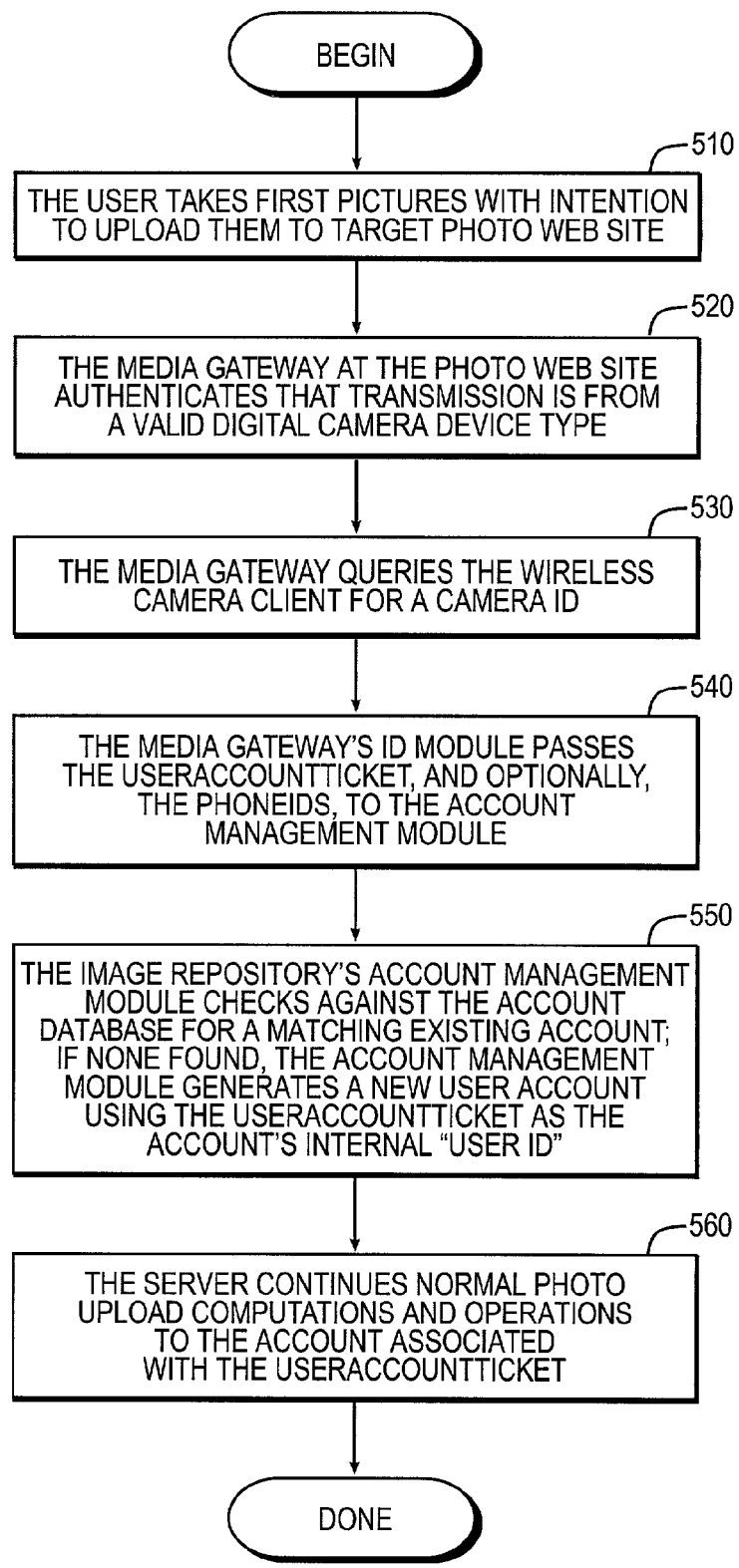
FIG. 5 is a flowchart illustrating the steps involved in the camera-centric account provisioning methodology.

As mentioned above, the preferred embodiment employs a camera-centric method for provisioning user accounts at a photo Web site. FIG. 5 is a flowchart illustrating the detailed method steps involved in this camera-centric account provisioning methodology, including illustrating the interaction among the user, the client (the digital camera coupled with the cellular phone), and the photo Web site service in the camera-centric account provisioning method. At step 510, the user takes his or her first pictures with the intention to upload them to a target photo Web site. In the preferred embodiment, pressing a single button on the digital camera initiates a cellular transmission to contact the server. At step 520, the media gateway at the photo Web site authenticates that the transmission is from a valid type of digital camera device. At step 530, the media gateway queries the wireless camera client for a camera ID (i.e., device ID data), which includes the "user account ticket information" (userAccountTicket datum), and optionally, one or more phone identifers or phoneIDs. At step 540, the ID module in the media gateway passes the userAccountTicket, and optionally, the phoneIDs, to the account management module; the server maintains the userAccountTicket and, optionally, phoneIDs, which is the full camera-centric identification data or information needed for associating a user account. The userAccountTicket is the camera device-generated token that consists of the gDevID of the device, encoded using a coding methodology that includes content descriptors indicating the presence (or lack there of) of various ID data. This coding approach is extensible; it allows other "identifiers" to be encoded for other provisioning schemes, as desired.

For the camera-centric provisioning method, the userAccountTicket serves a central role. This information or datum has a flexible definition that provides an encoding for one or more identifiers related to provisioning. In the currently-preferred camera-centric method, the single identifer, gDevID, is encoded in the ticket. This userAccountTicket is in a user readable form, being, "base32" encoded, i.e., 0..9 and 22 alphabetic characters (case-insensitive), which allows the user to type somewhere between 16 and 24 characters as the "ticket ID." However, it may be desirable to encode more than one piece of identifier or ID information data into the userAccountTicket, e.g., the IMSI and gDevID information, or the like. The flexible coding methodology for the userAccountTicket provides a mechanism for this. This "base32" alpha-numeric encoding of the userAccountTicket allows the human user to read and enter this datum when needed by a provisioning method. Depending on the number of ID data items that need to be encoded in the userAccountTicket, the encoding scheme methodology provides a mechanism to do so. Since the number of data items affects the total size of the userAccountTicket, consideration should be given as to the size of the identifier, which may be calculated as follows:

$\text{Log}_{base2}((32**24))=120$ bits, which may been encoded in 24 "base32 chars."

$\text{Log}_{base2}((32**20))=100$ bits, which may been encoded in 20 "base32 chars."

The following depicts the bit layout possible for various ticket composition items:
(1) IMSI: per spec GSM 03.03 IMSI is "no more than 15 digits," which is 50 bits.
(2) IMEI: per spec GSM 03.03 IMEI is "15 digits." This is 50 bits.
(3) "PSTN#" (Public Switch Telephone Network "phone number"): under GSM this appears to be "Structure of mobile station international PSTN/ISDN number" (MSISDN), which is 67 bits. The number consists of: (a) Country Code (CC) of the country in which the mobile station is registered, and (b) National (significant) mobile number, which consists of National Destination Code (NDC) and Subscriber Number (SN).
(4) gDevID: this datum consists of 32 bits of mui32SystemModelInfoNum (i.e., system model information) and 32 bits of mui32SystemSerialNum (i.e., system serial number), which is 64 bits.

The phoneIDs are one or more pre-existing numbers that are unique to the cellular phone; these may include IMSI, which is unique to the SIM (Subscriber Identity Module) card of a GSM cellular phone, and which is the unique number that the cellular carrier "maps" to an end user's Public Switch Telephone Network "phone number" (PSTN#). At step 550, the account management module in the image repository checks against the account database for a matching existing account. If no existing account is found, the account management module generates a new user account using the userAccountTicket as the account's internal "user ID." At step 560, the server continues normal photo upload computations and operations to the account associated with the userAccountTicket.

2. Phone-Centric Account Provisioning Methodology

Figure 6A:
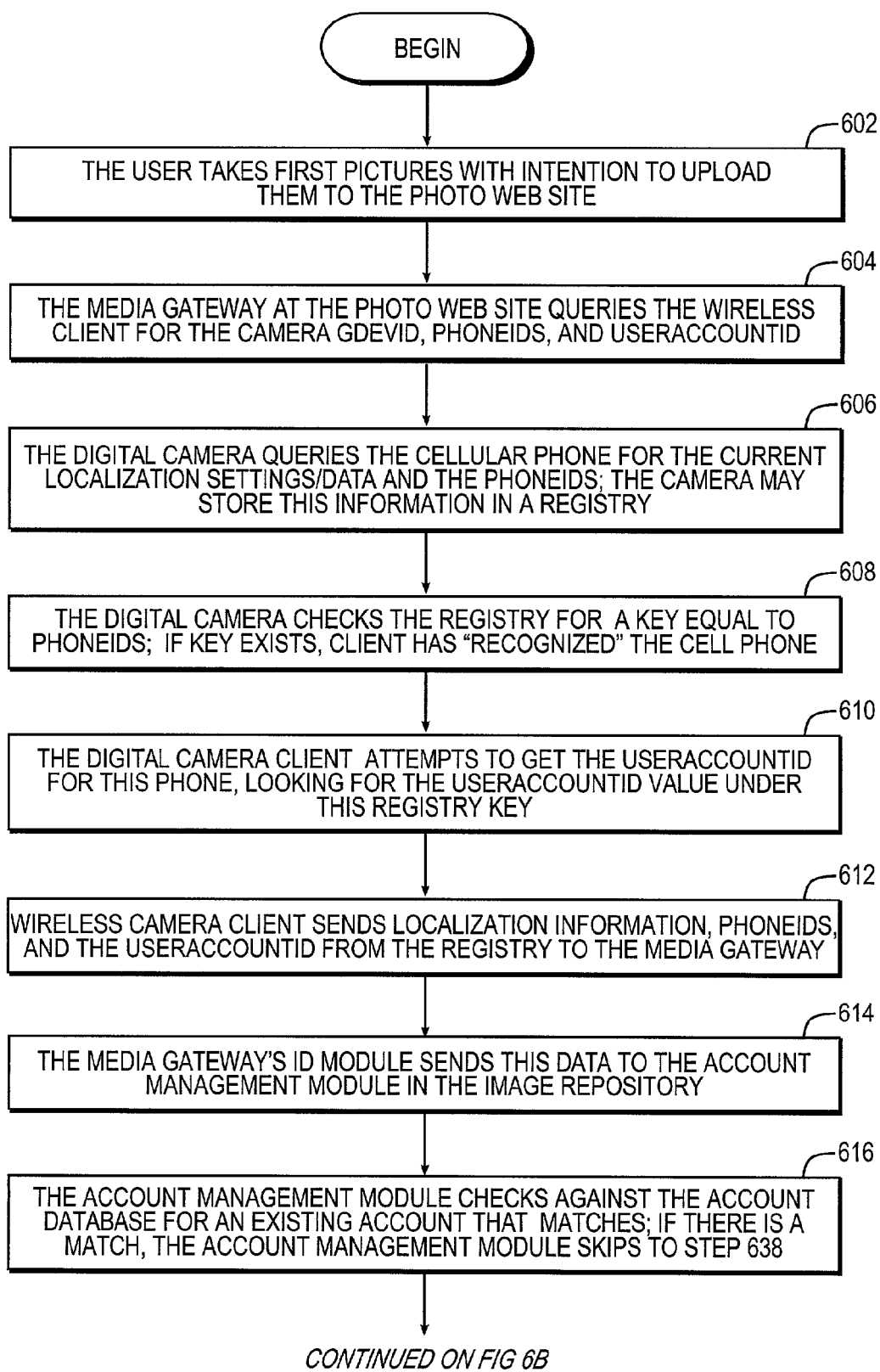
FIGS. 6A-C are flowcharts illustrating the steps for the phone-centric account provisioning methodology.
Figure 6B:
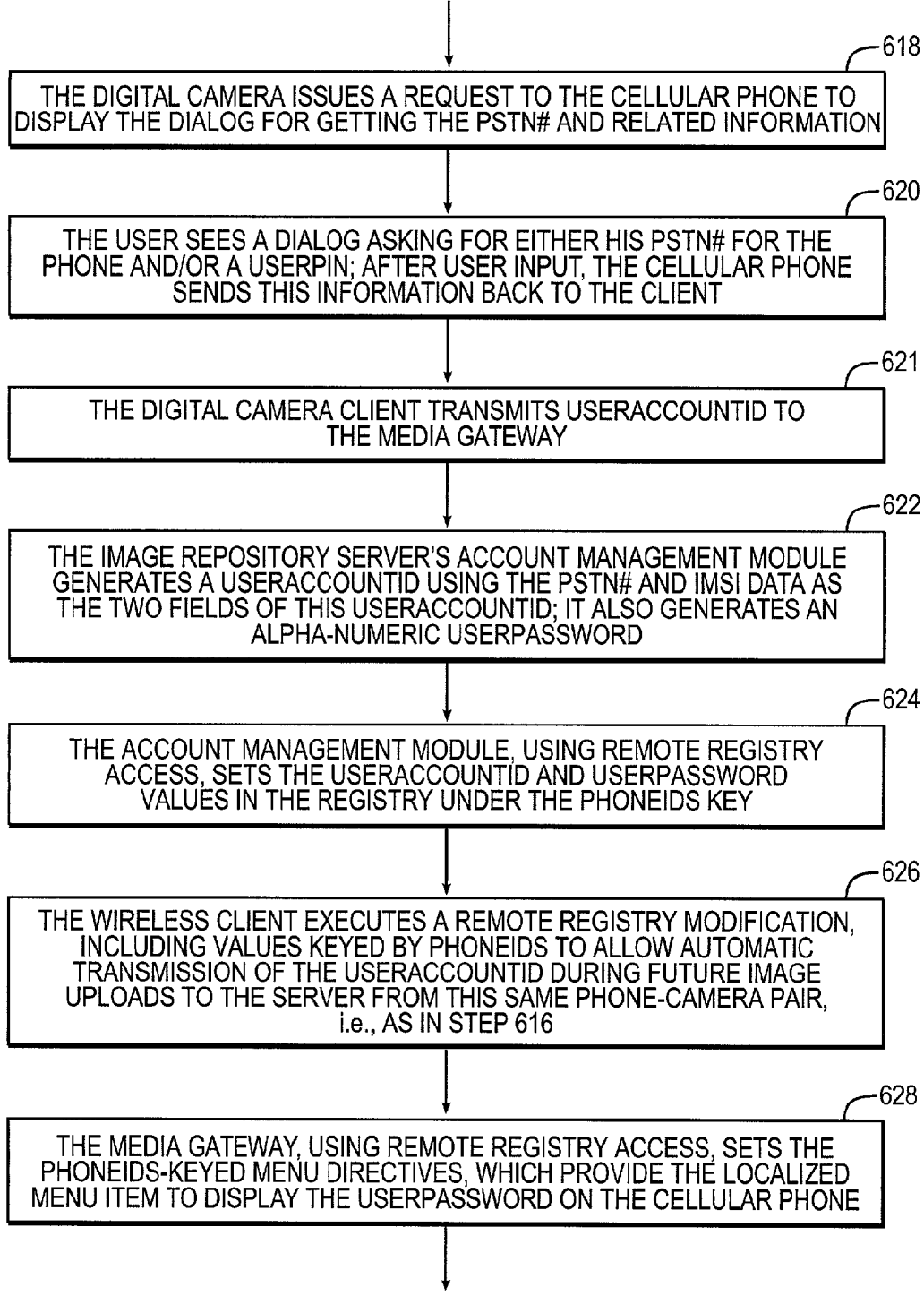
Figure 6C:
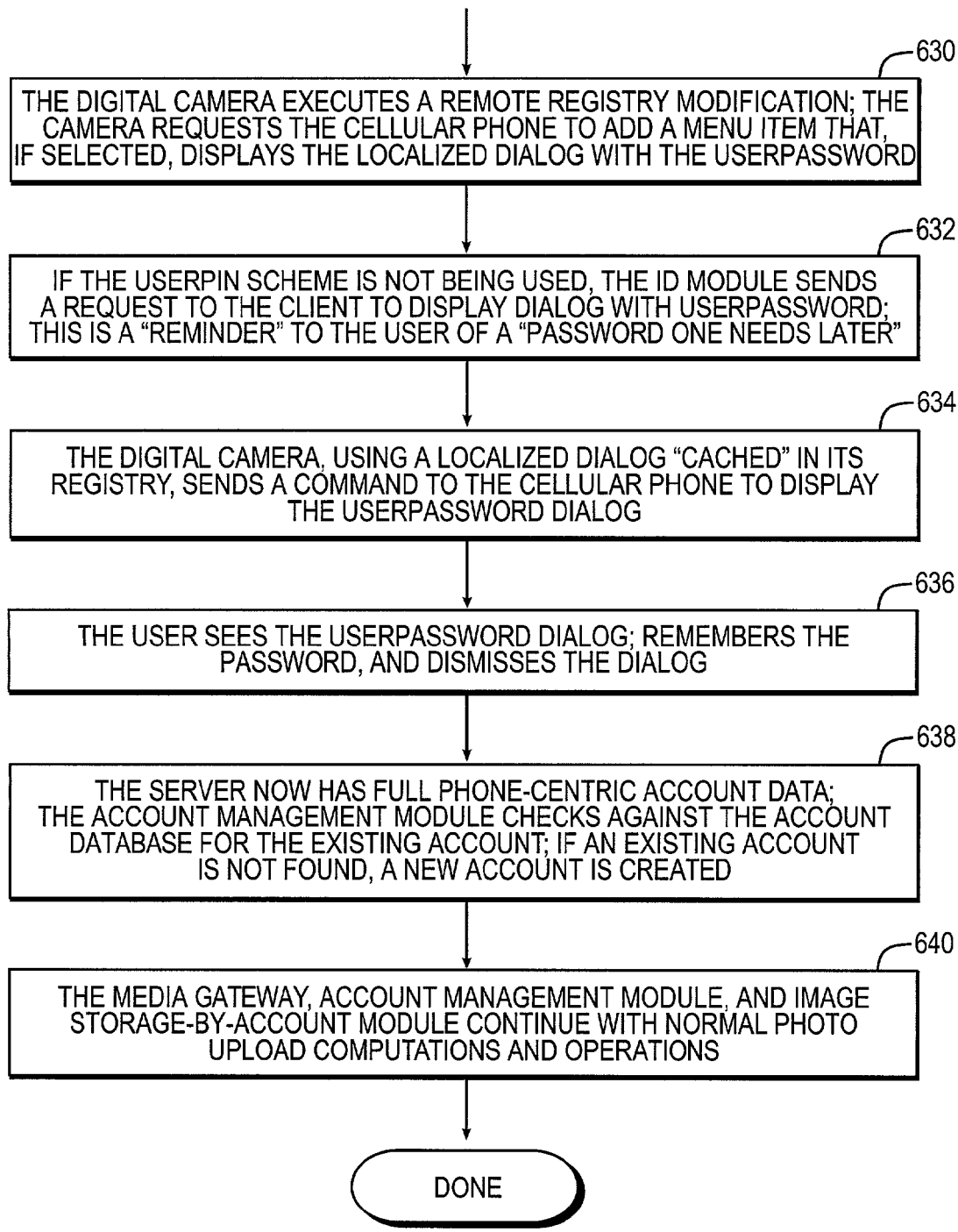

FIGS. 6A-C are flowcharts illustrating the detailed method steps for the phone-centric account provisioning methodology, including the interaction among the user, the client (the digital camera coupled with the cellular phone), and the photo Web site service in the phone-centric account provisioning method. At step 602, the user takes his or her first pictures with the intention to upload them to the photo Web site. In the present invention, pressing a single button on the digital camera initiates the cellular transmission to contact the server. At step 604, the media gateway at the photo Web site queries the wireless client for the camera gDevID, phoneIDs, and userAccountID.gDevID is a camera device's globally unique device ID, which is unique for every digital camera device built by any licensee. phoneIDs are one or more of the numbers that are unique to the cellular phone; these may include IMSI, which is unique to the SIM card of the GSM cellular phones, and which is the unique number that the cellular carrier "maps" to an end user's Public Switch Telephone Network "phone number" (PSTN#). Under the phone-centric provisioning method, only the IMSI is used, having a 1-to-1 correspondence to a PSTN#. In one variation, if the GSM cellular phone, given the cellular carrier has set the "my number" field in the user's GSM SIM card, this is sent as part of the phoneIDs' data to the server; this is the "cellular phone provides PSTN#" variation. This variation simplifies the end user experience.

At step 606, the digital camera queries the cellular phone for the current localization settings/data and the phoneIDs. The camera may store this information in a registry (i.e., local database of configuration information). At step 608, the digital camera checks the registry for the existence of a key (i.e., the name of a stored value) equal to phoneIDs; if the key exists, the client has "recognized" the cellular phone. At step 610, the cellular phone attempts to get the user account ID or userAccountID for this phone, looking for the userAccountID value under this registry key. At step 612, the wireless client sends the localization information, the phoneIDs, and the userAccountID from the registry (or null userAccountID, if unknown) to the media gateway. The userAccountID is a server-generated, system-internal Web account identifier that consists of two fields: PSTN# and IMSI. Provision of a non-null userAccountID value or datum in this step is not required for the successful operation of the system.

At step 614, the ID module in the media gateway sends this data to the account management module in the image repository, as previously described in the camera-centric flowchart. At step 616, the account management module checks against the account database for an existing account that matches. Upon examination of the response, if the account management module determines that there is an existing account for this set of phoneIDs, then the account management module skips to step 638.

If no account is found and the phoneIDs' data did not contain the PSTN#, however, the media gateway sends a localized dialog command to the client to the get PSTN# (and related information). A corresponding dialog is displayed on the LCD of the cellular phone for the user's attention, the exact contents of which are dependent on the variation of the provisioning scheme being used. If the "cellular phone provides PSTN#" variation is being used and the cellular phone was able to provide the PSTN# as part of the phoneIDs' data, the dialog is only necessary if a "userPIN" variation of this provisioning scheme is also being employed. In this case the dialog only prompts user to select a simple Personal Identification Number (PIN). If the "userPIN" variation is not used and, the server sees that the PSTN# was part of the phoneIDs' data, then the server skips to step 638. This "userPIN" variation may be used if field testing shows that it is more natural for users to be given the opportunity to choose their own PIN, or "password." Behind the scenes, the "userPassword" generation mechanisms, as described in the subsequent steps, are still present and may be used to help the user who chooses a PIN but subsequently forgets it prior to interacting with the Web server.

At step 618, the digital camera issues a request to the cellular phone to display the dialog for getting the PSTN# and related information. At step 620, the user sees a (modal) dialog asking for either his or her PSTN# for the phone and/or a userPIN; after the user's input, the cellular phone sends this information back to the client. If the user cancels the dialog and does not provide either the PSTN# and/or the userPIN, the client sends the media gateway an indication that the user "cancelled," and to wait for later user action. Optionally, even though the user has declined to enter the PSTN# and/or userPIN, the digital images may be sent to server (and are stored using the partial userAccountID, i.e., "null" PSTN# and a good IMSI); the gathering of the PSTN# is simply deferred. If the user has provided a PSTN# and/or userPIN, the client sends this user response data to the server. The digital camera client transmits the user account ID to the media gateway, as shown at step 621.

At step 622, the account management module in the image repository server generates a userAccountID using the PSTN# and IMSI data as the two fields of this userAccountID. The account management module also generates an alpha-numeric userPassword, for instance, using a secret hash key. This is the password the user is required to provide (if the userPIN variation of this scheme is not being used, or the user forgets his or her previously selected userPIN) in a Web server page that authenticates/associates the photo Web site user with the userAccountID, the phone-centric "internal" account under which all images was stored. At step 624, the account management module, using remote registry access, sets the userAccountID and userPassword values in the registry under the phoneIDs key. At step 626, the wireless client executes a remote registry modification, including values keyed by phoneIDs to allow automatic transmission of the userAccountID during future image uploads to the server from this same phone-camera pair, i.e., as in step 616. At step 628, the media gateway, using remote registry access, sets the phoneIDs-keyed menu directives, which provide the localized menu item to display the userPassword on the cellular phone.

At step 630, the digital camera executes a remote registry modification. The camera requests the cellular phone to add a menu item that, when selected, displays the localized (modal) dialog with the userPassword. At step 632, if the userPIN scheme is not being used, the ID module sends a request to the client to display dialog with the userPassword. This is a "reminder" to the user of a "password one needs later." At step 634, the digital camera, using a localized dialog "cached" in its registry, sends a command to the cellular phone to display the userPassword dialog. At step 636, the user sees the userPassword dialog; remembers the password, and dismisses the dialog.

At step 638, the server now has full phone-centric account data. The account management module checks against the account database for the existing account. If an existing account is not found, a new account is created. In the optional implementation scenario, where the user may defer providing a PSTN#, this account lookup key would only be the IMSI field of the userAccountID. At step 640, the media gateway, account management module, and image storage-by-account module continue with normal photo upload computations and operations.

D. Accessing User Accounts

Although a user account, once provisioned, is active and capable of receiving and storing digital images from the appropriate wireless camera client (i.e., the images are associated with a unique account stub), the user stills needs a user-friendly "login name or key" to view and access those pictures at the photo Web site via his or her browser software. The preferred embodiment employs a camera-centric method for accessing photos at the Web site associated with an account that was provisioned by the camera-centric method. For the phone-centric embodiment, a method is provided for accessing photos at the Web site associated with an account that was provisioned.

1. Camera-Centric Web Access

After the successful initial pre-provisioning between the cellular-enabled camera device and the server, the server state contains the userAccountTicket (and indirectly through this encoded data the camera device's gDevID), and (optionally) the cellular phone's set of phoneIDs. When considering the user interaction with the photo Web site using a Web browser, the user either has or has not previously personally created a user account on-line. In some cases, the user may want to open such an account prior to having uploaded any images from his or her digital camera. The browser user interface (UI) for the photo Web site has an element that attracts and informs users of the various options available to address these different conditions. If a user visits the Web server before sending any images from a valid camera device, and the user indicates that he or she has a wireless camera client, the user is informed that he or she may create an account prior to image uploading. The user is additionally informed that after uploading an image(s) from a valid wireless client, he or she will, when returning to the Web site, be able to easily access these images from the user's Web account. In both of these cases, the user expects to easily obtain access to his/her images.

Figure 7:
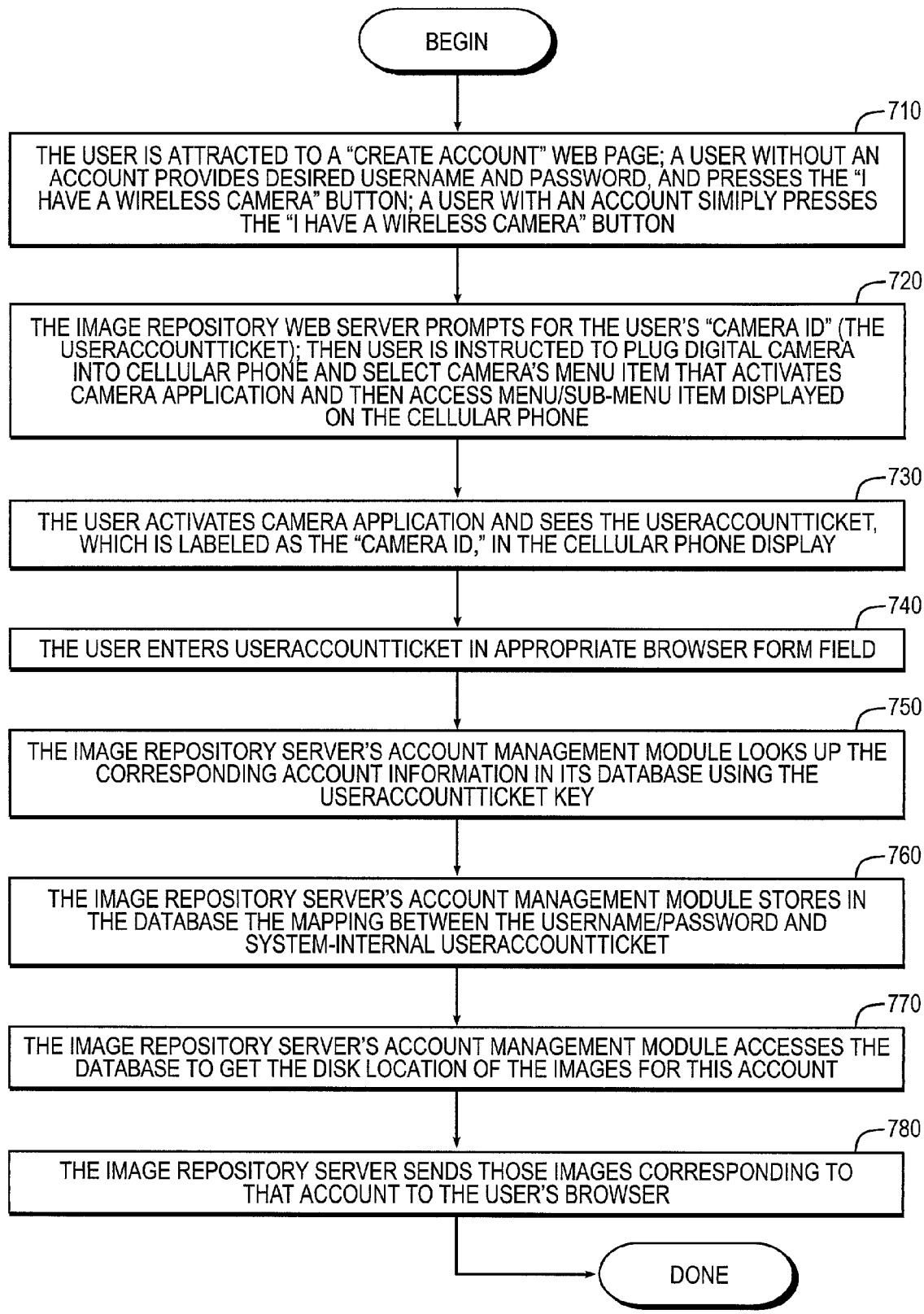
FIG. 7 is a flowchart illustrating the steps in the interaction between the user (browser) and the photo Web site service in the camera-centric method for enabling the user to access the photos he or she either previously posted or will later post to a photo Web site account.

FIG. 7 is a flowchart illustrating the sequential steps in the interaction between the user (browser) and the photo Web site service in the camera-centric method for enabling the user to access the photos he or she either previously posted or will later post to an account at the photo Web site. At step 710, the user is attracted to a "create account" Web page. If the user does not yet have an account, he or she provides a desired friendly user name and password, and then presses the "I have a wireless camera" button. If the user already has an existing account, he or she simply presses the "I have a wireless camera" button. At step 720, the image repository Web server prompts for the user's "camera ID," which is the userAccountTicket. Then the user is instructed to plug digital camera into a cellular phone, and select the Web page's menu item that activates the camera application menu/sub-menu item displayed on the cellular phone. At step 730, the user activates the camera application, and sees the userAccountTicket, which is labeled as the "camera ID," in the display on the cellular phone. At step 740, the user enters that userAccountTicket in the appropriate field on browser form.

At step 750, the account management module in the image repository server looks up the corresponding account information in its database (created previously when images were uploaded) using the userAccountTicket key. At step 760, the account management module in the image repository server stores in the database the mapping between the friendly user name/password and system-internal userAccountTicket. At step 770, the account management module in the image repository server accesses the database to get the disk location of the images for this account. At step 780, the image repository server sends those images corresponding to that account to the user's browser.

2. Phone-Centric Web Access

After the successful initial provisioning between the digital camera-enabled cellular phone and the server, the server state contains the userAccountID, the cellular phone's PSTN#, the cellular phone's IMSI, the userPassword, which the cellular phone computes from userAccountID using the secret hash key known to both the camera device and itself, and the digital camera device's gDevID. In an optional variation of the above scheme, the user is allowed to "decline" entering his/her PSTN#; however, the server still uploads the image data. The server still "knows" all of the above information, except the "full" userAccountID, because the userAccountID does not contain the user's PSTN# (i.e., the PSTN# field is null).

Figure 8A:
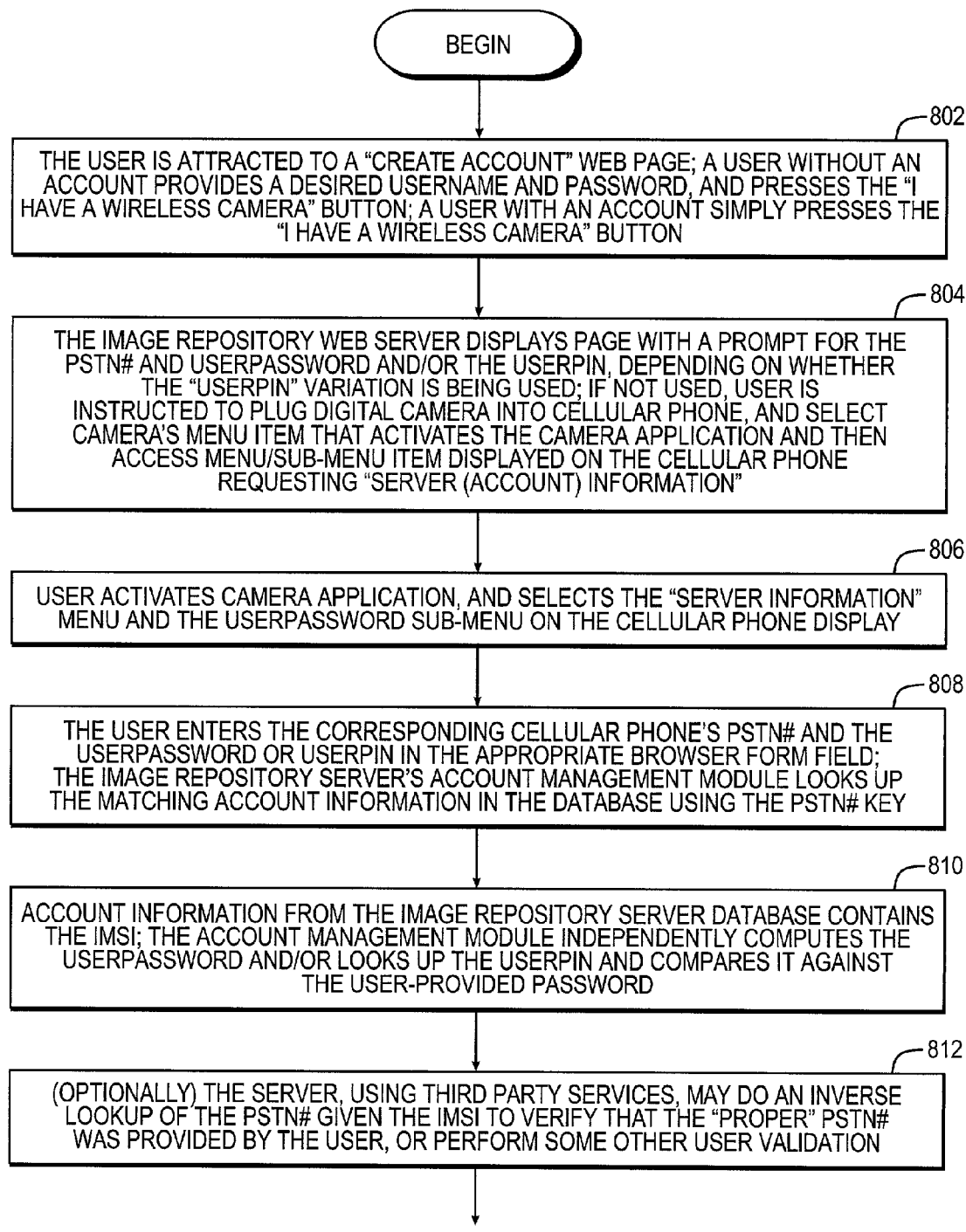
FIGS. 8A-B are flowcharts illustrating the steps in the interaction among the user (browser), the wireless camera client, and the photo Web site service in the phone-centric method for enabling the user to access the photos he or she posted and/or posts to a photo Web site account.
Figure 8B:
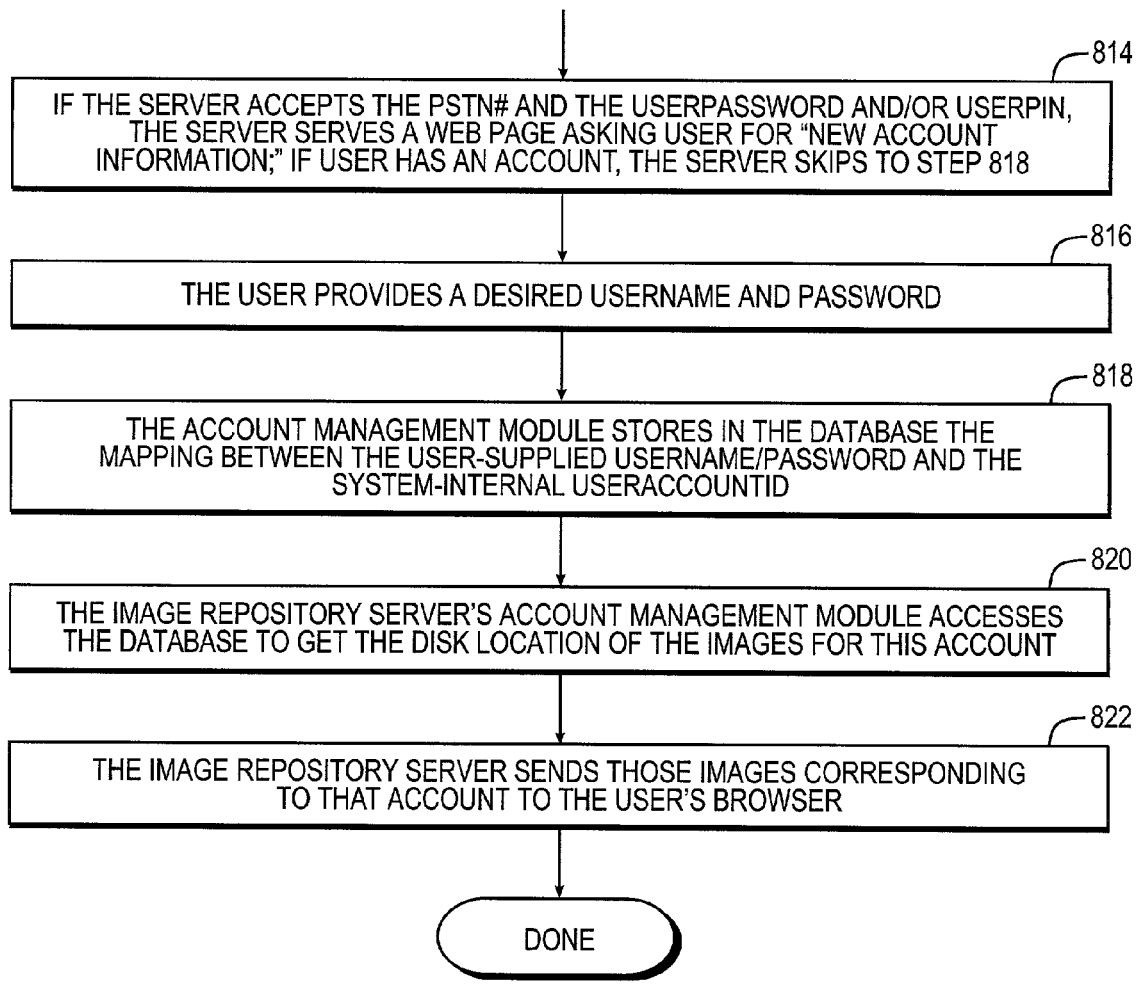

When the user accesses the main Web page for the photo Web site in his or her HTML browser, the user is attracted to an element in the Web page, and informed of the options for opening/accessing his or her account, as previously described in the camera-centric method. FIGS. 8A-B are flowcharts illustrating the sequential steps in the interaction among the user (browser), the wireless camera client, and the photo Web site service in the phone-centric method for enabling the user to access the photos he or she posted and/or hereby posts to an account at the photo Web site. At step 802, the user is attracted to a "create account" Web page. If the user does not yet have an account, he or she provides a desired friendly user name and password, and presses the "I have a wireless camera" button. If the user already has an existing account, he or she simply presses the "I have a wireless camera" button. At step 804, the image repository Web server displays page with a prompt for the PSTN# and for the userPassword and/or the userPIN, depending on whether the "userPIN" variation is being used. If the "userPIN" variation is not being used, the user is instructed to plug the digital camera into the cellular phone, and select the camera's menu item that activates the camera application and then access menu/sub-menu items displayed on the cellular phone to display "server (account) information." There is not a localization issue with this menu item; the wireless camera client has, under the control of the server using remote registry control, a cached menu/dialog in XML. This cache is established when the server was first contacted wirelessly in step 816. The digital camera devices have a file system which implements the cache.

At step 806, the user activates the camera application, and selects the "server information" menu and the userPassword sub-menu on the display on the cellular phone. At step 808, the user enters the corresponding cellular phone's PSTN# and the userPassword or userPIN in the appropriate field on browser form. The account management module in the image repository server looks up the matching account information in the database (created previously when images were uploaded) using the PSTN# key. At step 810, account information from the image repository server database contains the IMSI. The account management module independently computes the userPassword and/or looks up the userPIN and compares it against the user-provided password. At step 812, (which is optional) the server, using services provided by a third party may either do an inverse lookup of the PSTN# given the IMSI to verify that the "proper" PSTN# was provided by the user, or perform some other user validation. If the IMSI was not provided in the "clear" from the cellular phone in step 604 as previously shown in FIG. 6A, then either the Web site server or the third party will need to be provided with the inverse encryption procedure. At step 814, if the server accepts the PSTN# and the userPassword and/or userPIN, the server serves a Web page asking the user for "new account information," e.g., a desired user name, password, or the like. If the user already has an account, the server skips to step 818. At step 816, the user provides a desired (friendly) user name and password. At step 818, the account management module stores in the database the mapping between the user-supplied (friendly) user name/password and the system-internal userAccountID. At step 820, the account management module in the image repository server accesses the database to get the disk location of the images for this account. At step 822, the image repository server sends those images corresponding to that account to the user's browser.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A system facilitating uploading of digital images from a digital camera, the system comprising:

a Web site for hosting said digital images captured by the digital camera;

a transport mechanism for uploading the digital images from the digital camera to a user account at the Web site, said user account being pre-provisioned for the digital camera;

a module for automatically associating the digital images uploaded to the Web site with the pre-provisioned user account and thereafter providing on-line access to the digital images, without requiring a user to manually set up the user account;

a provisioning information module that generates a unique device ID that is used by an accounting management module for associating the digital images with a particular cellular phone device used by the digital camera to upload digital images; and a buffered image storage module to temporarily store the digital images during uploading prior to determining the pre-provisioned user account associated with the unique device ID, and prior to associating the digital images with a particular cellular phone device.

2. The system of claim 1, wherein said digital camera employs a cellular phone for wirelessly uploading the digital images.

3. The system of claim 2, wherein said digital camera and said cellular phone are selectively coupled to one another.

4. The system of claim 1, wherein a unique device ID associated with the digital camera is used for associating the digital images.

5. The system of claim 1, wherein said Web site receives digital images as they are uploaded.

6. The system of claim 1, wherein said Web site continues to store digital images that are uploaded for some period of time.

7. The system of claim 1, wherein said Web site provides on-line access to the digital images.

8. The system of claim 1, wherein said digital camera includes connectivity to a cellular phone, for uploading digital images.

9. The system of claim 1, wherein said digital camera includes wireless communication capability.

10. The system of claim 1, wherein said transport mechanism comprises a wireless communication network.

11. The system of claim 1, further comprising:
a database at the Web site for maintaining the uploaded digital images along with an associated unique device ID for the images.

12. The system of claim 1, further comprising: a module allowing a user to specify a user name and password for the user account that has been pre-provisioned.

13. The system of claim 1, wherein online access to the digital images is predicated upon user input of a valid user name and password.

14. An apparatus for automating activation of a user account associated with a user-operated device, comprising:
a Web site to host user data transferred by the user-operated device;
a transport mechanism to enable uploading of the user data from the user-operated device to a user account at the Web site, the user account being pre-provisioned for the user-operated device;
a module for automatically associating the user data uploaded to the Web site with the pre-provisioned user account based on a unique device ID of the transport mechanism, and thereafter providing on-line access to the user data, such that the user need not manually establish the user account at the Web site;
an identification module to determine if the data transferred by the user-operated device is from a valid type of user-operated device; and
a buffer to temporarily store the user data prior to determining the user account associated with the unique device ID.

15. The apparatus of claim 14, wherein the user-operated device is selected from among the following: a digital camera, a cellular telephone, a cellular telephone periodically coupled to a digital camera, and a cellular telephone including a digital camera.

16. The apparatus of claim 14, wherein the transport mechanism has a unique device ID that is used for associating the user-operated device with the user account that has been pre-provisioned for the user data.

17. The apparatus of claim 14, further comprising:
a provisioning information module to generate a unique device ID that is used by an accounting management module for associating the user-operated device with the user account.

18. The apparatus of claim 14, further comprising:
a database at the Web site for maintaining the uploaded user data along with an associated unique device ID for the images.

19. The apparatus of claim 14, further comprising:
a security module to allow a user to specify a user name and password for the user account that has been pro-provisioned.

20. The system of claim 14, further comprising:
the media gateway to query the peripheral device for the unique device ID in response to receiving the data.

21. A system to enable automatic provisioning of a new user account comprising:
a receiving logic to receive data from a peripheral device, coupled to a digital camera, having a unique device ID, the data destined for storage on a repository on the system;
an account management module to automatically establish a user account, including creating a user identifier (ID) based, at least in part, on said unique device ID assigned to the peripheral device;
a media gateway to associate the data with said user ID, wherein the media gateway includes a buffer to temporarily store the data prior to establishing the user account associated with the unique device ID;
such that an account is automatically created for the owner of the peripheral device, without requiring the user to first set up a user account, or any additional information to be stored on the peripheral device; and
a module allowing a user to specify a user name and password for the user account that has been automatically established, wherein online access to the data is predicated upon user input of the user specified user name and password.

22. A method facilitating uploading of user data from a user-operated device, the method comprising:
receiving a transfer request from a cellular phone having a unique device ID, to transfer data to a Web site from the user-operated device;
temporarily saving the user data in a buffered storage module until the user data is determined to be associated with a particular user account;
determining if there is a user account associated with the unique device ID, and if so, associating the user data with the user account;
if there is no user account associated with the unique device ID, establishing a user account automatically at the particular Web site, including creating a user identifier (ID) based, at least in part, on said unique device; and upon a first user request for data from the website, receiving the entry of a user defined login and password for providing access to data on the Website, and associating the user defined login and password with the user account.

23. The method of claim 22, wherein the user-operated device is selected from among the following: a digital camera, a cellular telephone, a cellular telephone periodically coupled to a digital camera, and a cellular telephone including a digital camera.

24. The method of claim 22, wherein establishing the user account occurs upon receiving a first transfer request from the user-operated device.

25. The method of claim 22, wherein establishing the user account occurs prior to first operation of the user-operated device.

26. The method of claim 22, wherein said user account is established using a provisioning procedure to associate the user account with a unique device ID assigned to at least one of the user-operated device or the cellular phone.

27. The method of claim 22, further comprising:
determining whether at least one of the user-operated device or the cellular phone is an authorized device prior to storing the images on the Web site.

28. The method of claim 22, wherein said content temporarily saved in the buffered image storage module is transferred to an image storage-by-account module in an image repository after the content is determined to be associated with a particular user account.

29. The method of claim 22, further comprising:
having a user account ticket, generated, at least in part, from the unique device ID, the user account ticket used for initially establishing the user account.

* * * * *